(12) United States Patent
Mochiku

(10) Patent No.: US 8,786,810 B2
(45) Date of Patent: Jul. 22, 2014

(54) LIQUID CRYSTAL DEVICE AND ELECTRONIC APPARATUS

(75) Inventor: Hiroshi Mochiku, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 87 days.

(21) Appl. No.: 13/232,309

(22) Filed: Sep. 14, 2011

(65) Prior Publication Data

US 2012/0086878 A1 Apr. 12, 2012

(30) Foreign Application Priority Data

Oct. 12, 2010 (JP) .................................. 2010-229318

(51) Int. Cl.
*G02F 1/1343* (2006.01)

(52) U.S. Cl.
USPC ................................ 349/139; 349/5; 349/153

(58) Field of Classification Search
None
See application file for complete search history.

(56) References Cited

U.S. PATENT DOCUMENTS

| 2005/0213017 | A1 | 9/2005 | Yamaguchi et al. |
| 2008/0055529 | A1 | 3/2008 | Shirasaka et al. |
| 2010/0225632 | A1 * | 9/2010 | Ma et al. ........................ 345/211 |

FOREIGN PATENT DOCUMENTS

| JP | 04-125617 A | 4/1992 |
| JP | 8-201830 A | 8/1996 |
| JP | 2002-196355 A | 7/2002 |
| JP | 2004-046266 A | 2/2004 |
| JP | 2005-275144 A | 10/2005 |
| JP | 2006-171033 A | 6/2006 |
| JP | 2007-316119 A | 12/2007 |
| JP | 2008-058497 A | 3/2008 |
| JP | 2008-151849 A | 7/2008 |
| JP | 2008-268253 A | 11/2008 |

* cited by examiner

*Primary Examiner* — Richard Kim
(74) *Attorney, Agent, or Firm* — ALG Intellectual Property, LLC

(57) ABSTRACT

A first peripheral electrode and a second peripheral electrode are provided at a peripheral region sandwiched between a pixel region and a seal material in a first substrate of a liquid crystal device, and strength of electric potentials which are applied to the first peripheral electrode, the second peripheral electrode, and a common electrode of an opposite substrate satisfies the condition of the second peripheral electrode<the common electrode<the first peripheral electrode. Therefore, electric fields are formed between the first peripheral electrode and the common electrode, between the second peripheral electrode and the common electrode, and between the first peripheral electrode and the second peripheral electrode.

15 Claims, 13 Drawing Sheets

LIQUID CRYSTAL DEVICE AND ELECTRONIC APPARATUS

BACKGROUND

1. Technical Field

The present invention relates to a liquid crystal device in which liquid crystal is held between a pair of substrates and a projection type display apparatus which utilizes the liquid crystal device as a light valve.

2. Related Art

In a liquid crystal device, a first substrate, at which a pixel region which is configured by arranging a plurality of pixel electrodes at one face side is provided, and a second substrate, at which a common electrode to which a common potential is applied is provided, are bonded to each other by a seal material and a liquid crystal layer is held in a region surrounded by the seal material between the first substrate and the second substrate. Such a liquid crystal device is used as a light valve of a direct-view type display apparatus or a projection type display apparatus.

In such a liquid crystal device, if ionic impurities mixed in at the time of liquid crystal injection or ionic impurities eluted from the seal material aggregate within the pixel region by driving of the liquid crystal device, deterioration of display quality such as burning (staining) or the like of an image is caused. Therefore, there is proposed a technique of providing a peripheral electrode at the outside of the pixel region and preventing aggregation of the ionic impurities in the pixel region by such a peripheral electrode (refer to Paragraph [0049] or the like of JP-A-2006-171033, FIG. 4 or the like of JP-A-2008-58497, and Paragraph [0053] or the like of JP-A-2008-268253).

For example, in the technique described in JP-A-2006-171033, a peripheral electrode (dummy wiring electrode), to which the same electric potential as that of a common electrode is applied, is provided at a corner portion of a peripheral region and ionic impurities are drawn to the peripheral electrode. In the technique described in JP-A-2008-58497, a first peripheral electrode and a second peripheral electrode are provided so as to surround a pixel region and by applying different electric potentials to the first peripheral electrode and the second peripheral electrode and also inverting the polarity of the electric potentials which are applied to the first peripheral electrode and the second peripheral electrode for each frame, minute fluctuation of the liquid crystal and movement of ionic impurities are performed by a transverse electric field between the first peripheral electrode and the second peripheral electrode. In the technique described in JP-A-2008-268253, a peripheral electrode is provided so as to surround a pixel region and an electric potential having higher frequency than a signal which is applied to a pixel electrode is applied to the peripheral electrode, thereby moving ionic impurities to a peripheral region.

However, even in the technique described in any of JP-A-2006-171033, JP-A-2008-58497, and JP-A-2008-268253, there is a problem in that it is not possible to prevent deterioration of display quality due to ionic impurities. That is, as in the technique described in JP-A-2006-171033, in a case where the same electric potential is applied to the dummy wiring electrode of the first substrate side and the common electrode of the second substrate side, since an electric field cannot be formed between the dummy wiring electrode and the common electrode, there is a problem in that it is not possible to sufficiently draw in the ionic impurities. Also, as in the technique described in JP-A-2008-58497 and JP-A-2008-268253, in a case where the polarity of the electric potential which is applied to the peripheral electrode changes, for example, anionic impurities among the ionic impurities move toward the peripheral electrode when the electric potential of the peripheral electrode has a positive polarity. However, if the electric potential of the peripheral electrode is changed to a negative polarity, since the impurities move in a direction away from the peripheral electrode, there is a problem in that it is not possible to draw in and retain the ionic impurities in the vicinity of the peripheral electrode. Therefore, even in the technique described in any of JP-A-2006-171033, JP-A-2008-58497, and JP-A-2008-268253, since it is difficult to reliably prevent aggregation of the ionic impurities in the pixel region, there is a problem in that it is not possible to prevent deterioration of display quality due to ionic impurities.

SUMMARY

An advantage of some aspects of the invention is that it provides a liquid crystal device in which deterioration of display quality due to ionic impurities can be reliably prevented by reliably drawing the ionic impurities to the vicinity of a peripheral electrode and then making the ionic impurities be retained in the vicinity of the peripheral electrode, and a projection type display apparatus provided with the liquid crystal device.

According to an aspect of the invention, there is provided a liquid crystal device including: a first substrate, at which a pixel region which is configured by arranging a plurality of pixel electrodes at one face side is provided; a second substrate, at which a common electrode to which a common potential is applied is provided; a seal material which bonds the first substrate and the second substrate to each other; a liquid crystal layer held in a region surrounded by the seal material between the first substrate and the second substrate; and a first peripheral electrode which is provided at a peripheral region sandwiched between the pixel region and the seal material at one face side of the first substrate and to which a constant potential different from the common potential is applied.

In the liquid crystal device according to the aspect of the invention, since the first peripheral electrode with a constant potential different from the common potential applied thereto is provided at the peripheral region of the first substrate, an electric field in the layer thickness direction of the liquid crystal layer is generated between the first peripheral electrode and the common electrode. For this reason, even in a case where ionic impurities mixed in at the time of liquid crystal injection or ionic impurities eluted from the seal material exist within liquid crystal layer and such ionic impurities aggregate at an end portion of the pixel region in accordance with liquid crystal driving, the ionic impurities are efficiently drawn to the first peripheral electrode in the peripheral region or a portion facing the first peripheral electrode in the common electrode. Further, since an electric potential which is applied to the first peripheral electrode is a constant potential, the ionic impurities drawn to the first peripheral electrode or a portion facing the first peripheral electrode in the common electrode are retained at the peripheral region in a state where they are aggregated there, so that the ionic impurities do not exude to the pixel region. Therefore, it is possible to reliably prevent deterioration of display quality due to the ionic impurities. Further, since it is acceptable if the first peripheral electrode is provided only at the first substrate side and there is no need to provide a peripheral electrode at the second substrate side, it is acceptable if power feeding to the second substrate is performed with respect to the common electrode only, so that deterioration of display quality due to the ionic impurities can be reliably prevented with a simple configuration such as there being no need to add inter-substrate conduction. Further, since it is acceptable if a constant potential is applied to the first peripheral electrode, deterioration of display quality due to the ionic impurities can be reliably prevented by a simple circuit configuration.

In the liquid crystal device according to the aspect of the invention, it is preferable that at the peripheral region, a second peripheral electrode with a constant potential different from that of the first peripheral electrode applied thereto be provided at a position adjacent to the first peripheral electrode. According to such a configuration, since a transverse electric field is generated between the first peripheral electrode and the second peripheral electrode, it is possible to efficiently draw in the ionic impurities by using such a transverse electric field, thereby making the ionic impurities be retained in a state where they are aggregated there. Therefore, deterioration of display quality due to the ionic impurities can be reliably prevented.

In the liquid crystal device according to the aspect of the invention, it is preferable that an electric potential which is applied to the first peripheral electrode, an electric potential which is applied to the second peripheral electrode, and an electric potential which is applied to the common electrode satisfy the condition of the second peripheral electrode<the common electrode<the first peripheral electrode. According to such a configuration, since an electric field in the layer thickness direction of the liquid crystal layer is also generated between the second peripheral electrode and the common electrode similarly to between the first peripheral electrode and the common electrode, the ionic impurities are efficiently drawn to the second peripheral electrode or a portion facing the second peripheral electrode in the common electrode. At this time, anionic impurities and cationic impurities are respectively drawn to the first peripheral electrode and the second peripheral electrode and retained in a state where they are aggregated there. Therefore, deterioration of display quality due to the ionic impurities can be reliably prevented.

In the liquid crystal device according to the aspect of the invention, it is preferable that the pixel region and the seal material respectively have a quadrangular shape as a whole and the first peripheral electrode and the second peripheral electrode are provided at a corner region sandwiched between a corner portion of the pixel region and a corner portion of the seal material. Since at the time of liquid crystal driving, the ionic impurities are apt to be eccentrically located at the corner portion of the pixel region, if the first peripheral electrodes and the second peripheral electrodes are disposed at the corner region, it is possible to efficiently draw the ionic impurities from the pixel region, thereby making the ionic impurities be retained in a state where they are aggregated there. Further, in a case where the corner portion of the seal material is made to be a curved shape, since at the outside of the corner portion of the pixel region, the width dimension of the peripheral region often becomes narrow compared to other places, the aggregated ionic impurities tend to easily protrude to the corner portion of the pixel region. However, if the first peripheral electrodes and the second peripheral electrodes are disposed at the corner region, it is possible to efficiently draw in the ionic impurities, thereby making the ionic impurities be retained in a state where they are aggregated there. Therefore, deterioration of display quality due to the ionic impurities can be reliably prevented.

In the liquid crystal device according to the aspect of the invention, it is preferable that the first peripheral electrode and the second peripheral electrode are provided only at four corner regions. Since the ionic impurities easily protrude into the pixel region because of the corner region, if the first peripheral electrode and the second peripheral electrode are provided at the corner region, it is possible to reliably prevent deterioration of display quality due to the ionic impurities.

In the liquid crystal device according to the aspect of the invention, a configuration may be adopted in which the first peripheral electrode and the second peripheral electrode are provided at all of four corner regions, the first peripheral electrodes disposed at two adjacent corner regions among the four corner regions are connected to each other by a first extension portion which extends along a side portion of the pixel region, and the second peripheral electrodes disposed at two adjacent corner regions among the four corner regions are connected to each other by a second extension portion which extends along a side portion of the pixel region. According to such a configuration, it is possible to draw in the ionic impurities in all the peripheries of the pixel region, thereby making the ionic impurities be retained in a state where they are aggregated there. Therefore, deterioration of display quality due to the ionic impurities can be reliably prevented.

In the liquid crystal device according to the aspect of the invention, it is preferable that the first peripheral electrode has a larger width dimension than the first extension portion and the second peripheral electrode has a larger width dimension than the second extension portion. According to such a configuration, since the areas of the first peripheral electrode and the second peripheral electrode which are located at the corner portion where the ionic impurities are easily eccentrically located are wide, it is possible to make the ionic impurities drawn to the corner region be retained in large amounts at the formation regions of the first peripheral electrode and the second peripheral electrode and the vicinity thereof.

In the liquid crystal device according to the aspect of the invention, it is preferable that the first peripheral electrode and the second peripheral electrode are made of the same electrical conducting material as the pixel electrode. According to such a configuration, it is possible to provide the first peripheral electrode and the second peripheral electrode at the upper layer side of the first substrate even without adding new conductive films.

In the liquid crystal device according to the aspect of the invention, it is preferable that at the first substrate, a plurality of dummy pixel electrodes which is made of the same electrical conducting material as the pixel electrode is provided outside the pixel region and some of the plurality of dummy pixel electrodes are connected to each other, so that the first peripheral electrode and the second peripheral electrode are constituted. If dummy pixel electrodes are provided at the peripheral region, there is an advantage such as being able to make the uppermost layer of the first substrate a continuous flat surface in a boundary portion between the pixel region and the peripheral region. Further, if the first peripheral electrode and the second peripheral electrode are formed using the dummy pixel electrodes, it is possible to provide the first peripheral electrode and the second peripheral electrode at the upper layer side of the first substrate even without adding new conductive films.

The liquid crystal device according to the aspect of the invention can be used, for example, as a light valve of a projection type display apparatus, or a direct-view type display apparatus. In a case where the liquid crystal device according to the aspect of the invention is used in the projection type display apparatus, the projection type display apparatus includes a light source section that emits light which is supplied to the liquid crystal device, and a projection optical system that projects light modulated by the liquid crystal device. According to such a configuration, in the projection type display apparatus or the direct-view type display apparatus, it is possible to reliably prevent deterioration of display quality due to the ionic impurities. Further, in the case of the projection type display apparatus, particularly, since heat resistance is required for the liquid crystal device, an inorganic alignment film which easily adsorbs ionic impurities is used as an alignment film, so that the ionic impurities easily aggregate in the pixel region. However, according to the invention, even in a case where an inorganic alignment film is used, it is possible to reliably prevent aggregation of the ionic impurities in the pixel region.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
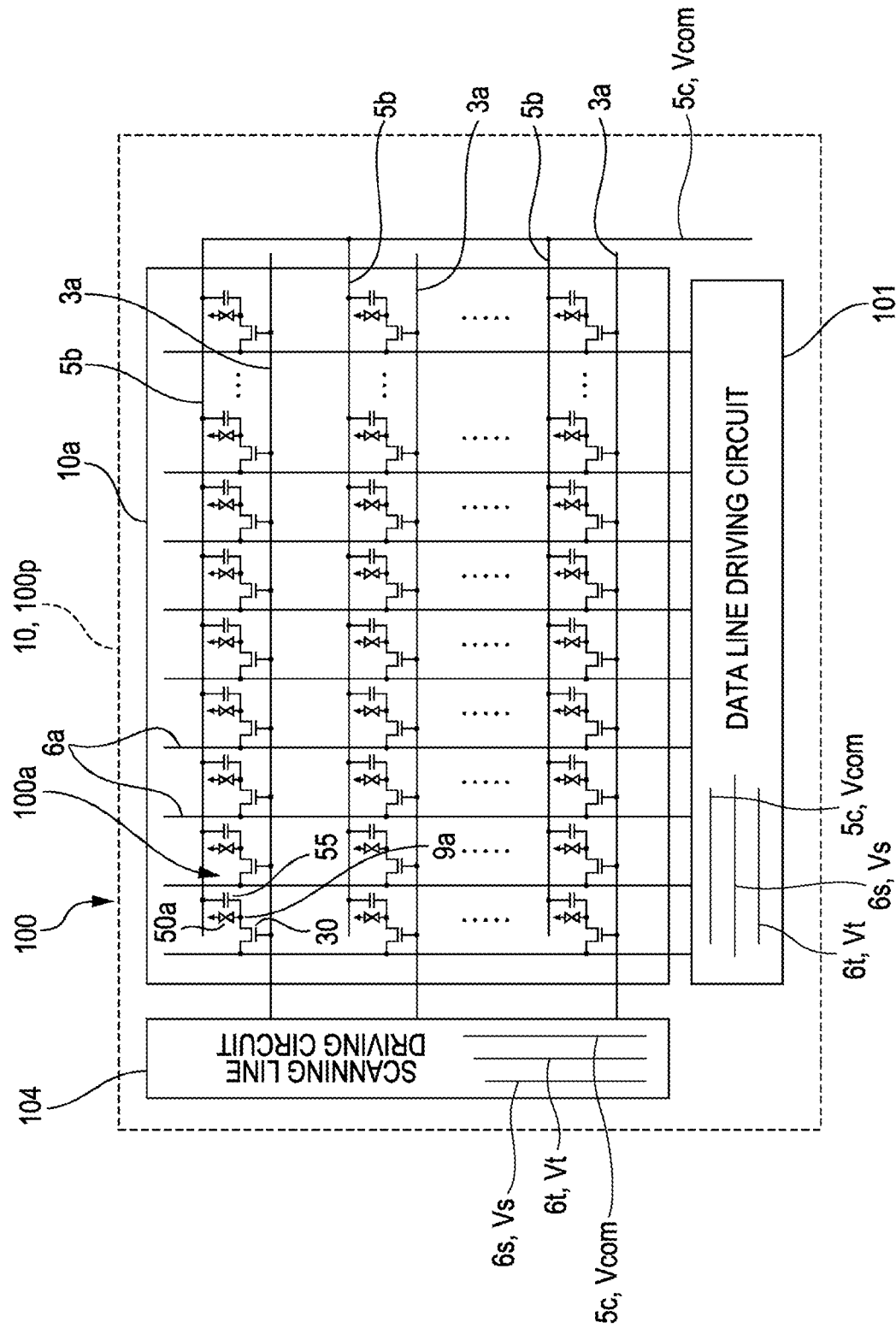
FIG. 1 is a block diagram illustrating the electrical configuration of a liquid crystal device with the invention applied thereto.

Embodiments of the invention will be described with reference to the drawings. In addition, in the drawings referred to in the following description, in order to make each layer or each member the size to an extent that can be recognized in the drawings, a scale is made to be different for each layer or each member. In addition, in a case where the direction of an electric current that flows through a field-effect transistor is inverted, a source and a drain are changed to each other. However, in the following description, for convenience, a description is performed with a side, to which a pixel electrode is connected, set to be a drain and a side, to which a data line is connected, set to be a source.

Embodiment 1

Overall Configuration

FIG. 1 is a block diagram illustrating the electrical configuration of a liquid crystal device with the invention applied thereto. In FIG. 1, a liquid crystal device 100 has a liquid crystal panel 100p of a TN (Twisted Nematic) mode or a VA (Vertical Alignment) mode, and the liquid crystal panel 100p includes a pixel region 10a (an image display area) in which a plurality of pixels 100a is arranged in a matrix form at the central area thereof. In the liquid crystal panel 100p, in a first substrate 10 (refer to FIGS. 2A and 2B or the like) which will be described later, a plurality of data lines 6a and a plurality of scanning lines 3a extend vertically and horizontally inside the pixel region 10a, and the pixel 100a is constituted at a position corresponding to the intersection point of the lines. A pixel transistor 30, which is made of a field-effect transistor, and a pixel electrode 9a, which will be described later, are formed at each of the plurality of pixels 100a. The data line 6a is electrically connected to the source of the pixel transistor 30, the scanning line 3a is electrically connected to the gate of the pixel transistor 30, and the pixel electrode 9a is electrically connected to the drain of the pixel transistor 30.

In the first substrate 10, a scanning line driving circuit 104 and a data line driving circuit 101 are provided further at the outer periphery side than the pixel region 10a. The data line driving circuit 101 is electrically connected to each data line 6a and sequentially supplies an image signal which is supplied from an image processing circuit, to the respective data lines 6a. The scanning line driving circuit 104 is electrically connected to each scanning line 3a and sequentially supplies a scanning signal to the respective scanning lines 3a.

In each pixel 100a, the pixel electrode 9a faces a common electrode formed on a second substrate 20 (refer to FIGS. 2A and 2B or the like), which will be described later, with a liquid crystal layer interposed therebetween, thereby constituting a liquid crystal capacitor 50a. Further, at each pixel 100a, a retention capacitor 55 is added in parallel to the liquid crystal capacitor 50a in order to prevent variation of the image signal which is retained by the liquid crystal capacitor 50a. In this embodiment, in order to constitute the retention capacitor 55, a capacitance line 5b extending in parallel with the scanning line 3a over a plurality of pixels 100a is formed.

In such a liquid crystal device 100, wirings such as a common potential line 5c with a common potential Vcom applied thereto, a first constant potential line 6s of the high-potential side with a constant potential Vs applied thereto, and a second constant potential line 6t of the low-potential side with a constant potential Vt applied thereto extend in a formation area of the scanning line driving circuit 104 or the data line driving circuit 101 and the vicinity thereof, and the capacitance line 5b is electrically connected to the common potential line 5c. Further, peripheral electrodes, which will be described later, are electrically connected to the first constant potential line 6s and the second constant potential line 6t.

Configurations of Liquid Crystal Panel 100p and First Substrate 10

Figure 2A:
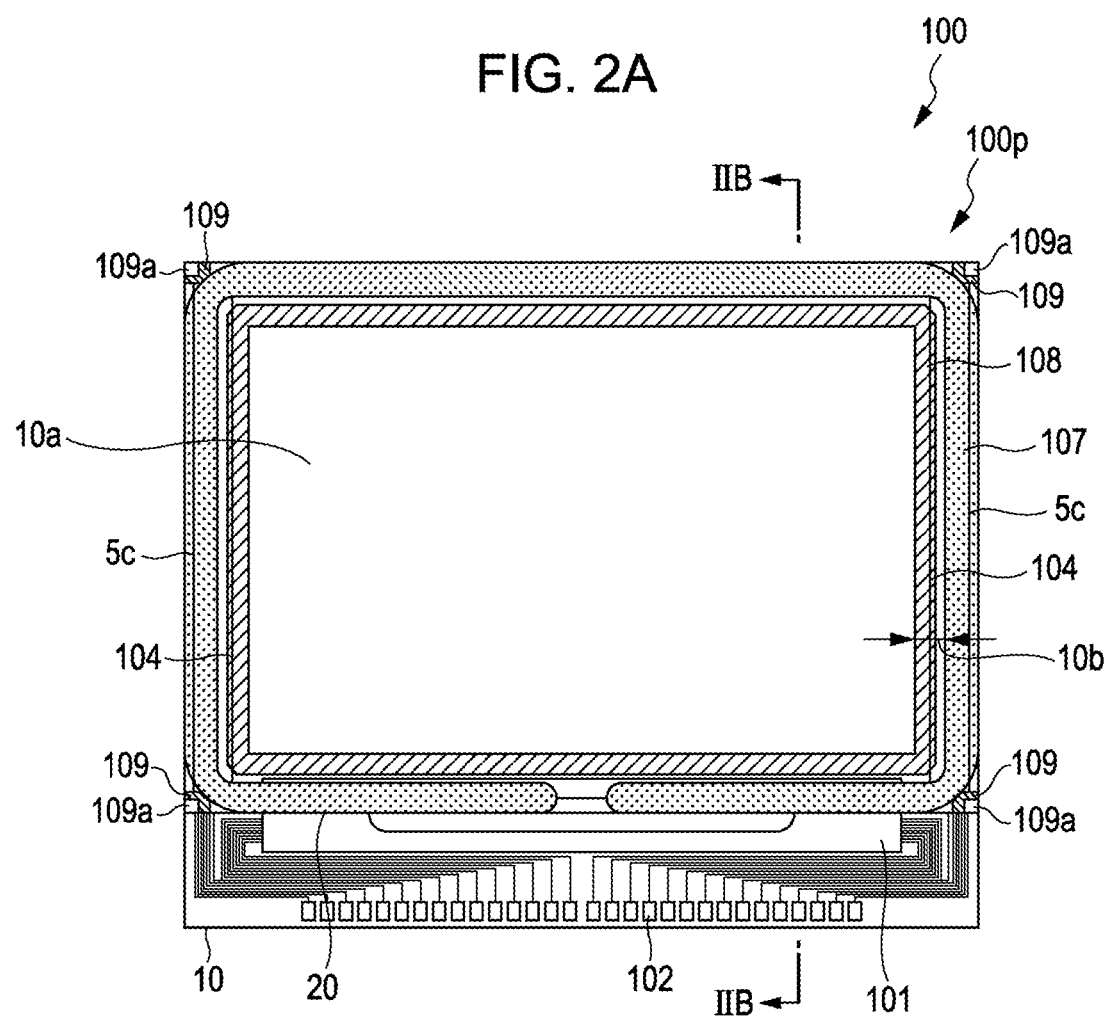
FIGS. 2A and 2B are explanatory diagrams of a liquid crystal panel of the liquid crystal device with the invention applied thereto.
Figure 2B:
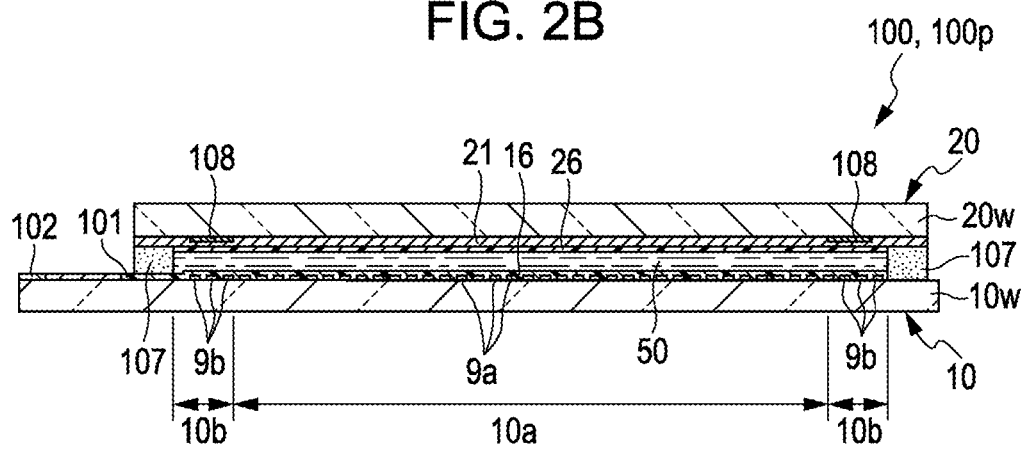

FIGS. 2A and 2B are explanatory diagrams of the liquid crystal panel 100p of the liquid crystal device 100 with the invention applied thereto, and FIGS. 2A and 2B respectively are a plan view of the liquid crystal panel 100p of the liquid crystal device 100 with the invention applied thereto when viewing along with the respective constituent elements from the opposite substrate side and a cross-section view taken along line IIB-IIB of FIG. 2A. As shown in FIGS. 2A and 2B, in the liquid crystal panel 100p, the first substrate 10 and the second substrate 20 are bonded to each other by a seal material 107 with a predetermined gap interposed therebetween and the seal material 107 is provided in a frame shape so as to follow the outer edge of the second substrate 20. The seal material 107 is an adhesive agent made of light curing resin, thermosetting resin, or the like and a gap material such as fiberglass or glass beads for making the distance between both the substrates a given value is mixed therewith.

In the liquid crystal panel 100p having such a configuration, both the first substrate 10 and the second substrate 20 are a quadrangle and at the approximate center of the liquid crystal panel 100p, the pixel region 10a described with reference to FIG. 1 is provided as a quadrangular region. The seal material 107 is also provided in an approximate quadrangle corresponding to such a shape and a peripheral region 10b of an approximate quadrangle is provided in a picture frame shape between the inner peripheral edge of the seal material 107 and the outer peripheral edge of the pixel region 10a.

In the first substrate 10, at the outside of the pixel region 10a, the data line driving circuit 101 and a plurality of terminals 102 are formed along one side of the first substrate 10 and the scanning line driving circuit 104 is formed along the other side adjacent to one side.

Although the details will be described later, the pixel transistor 30 described with reference to FIG. 1 and the pixel electrode 9a which is electrically connected to the pixel transistor 30 are formed in a matrix form at the pixel region 10a in the substrate surface of one side of the first substrate 10 and an alignment film 16 is formed at the upper layer side of such a pixel electrode 9a.

Further, a dummy pixel electrode 9b (refer to FIG. 2B) formed simultaneously with the pixel electrode 9a is formed at the peripheral region 10b in the substrate surface of one side of the first substrate 10. Here, with respect to the dummy pixel electrode 9b, a configuration in which it is electrically connected to a dummy pixel transistor, a configuration in which it is electrically connected directly to a wiring without being provided with the dummy pixel transistor, or a configuration in which it is in a floating state where an electric potential is not applied is adopted. Such a dummy pixel electrode 9b contributes to making a surface, on which the alignment film 16 is formed, a flat surface by compressing a height position between the pixel region 10a and the peripheral region 10b, when planarizing the surface, on which the alignment film 16 is formed, by polishing at the first substrate 10. Further, if the dummy pixel electrode 9b is set to be a given electric potential, it is possible to prevent disorder of orientation of liquid crystal molecules at an end portion on the outer periphery side of the pixel region 10a.

A common electrode 21 is formed on a substrate surface of one side facing the first substrate 10 in the second substrate 20, and an alignment film 26 is formed on an upper layer of the common electrode 21. The common electrode 21 is formed over approximately the entire surface of the second substrate 20 or as a plurality of strip-shaped electrodes over a plurality of pixels 100a. Further, on the substrate surface of one side facing the first substrate 10 in the second substrate 20, a light shielding layer 108 is formed at the lower layer side of the common electrode 21. In this embodiment, the light shielding layer 108 is formed into a picture frame shape extending along the outer peripheral edge of the pixel region 10a. Here, the outer peripheral edge of the light shielding layer 108 is at a position spaced from the inner peripheral edge of the seal material 107, so that the light shielding layer 108 and the seal material 107 do not overlap each other. In addition, in the second substrate 20, the light shielding layer 108 is also sometimes formed at a region overlapping the region sandwiched between adjacent pixel electrodes 9a, or the like.

In the liquid crystal panel 100p configured in this manner, on the first substrate 10, electrodes for inter-substrate conductors 109 for electrically conducting between the first substrate 10 and the second substrate 20 are formed at regions overlapping with corner portions of the second substrate 20 further outside than the seal material 107, and such electrodes for inter-substrate conductors 109 are electrically connected to the common potential line 5c. Further, an inter-substrate conduction material 109a such as a so-called silver point is disposed at a position overlapping with the electrode for inter-substrate conductors 109 and the common potential line 5c of the first substrate 10 and the common electrode 21 of the second substrate 20 are electrically connected to each other through the inter-substrate conduction material 109a. For this reason, the common potential Vcom is applied to the common electrode 21 from the first substrate 10 side.

Here, the seal material 107 has approximately the same width dimension and is provided along the outer peripheral edge of the second substrate 20. For this reason, the seal material 107 is an approximate quadrangle. However, the seal material 107 is provided so as to pass through the inside while avoiding the electrode for inter-substrate conductors 109 at the region overlapping with the corner portion of the second substrate 20, and a corner portion of the seal material 107 has an approximate arc shape.

In the liquid crystal device 100 having such a configuration, if the pixel electrode 9a and the common electrode 21 are formed of a light-transmitting conductive film, a transmission type liquid crystal device can be configured. In contrast, if one of the pixel electrode 9a and the common electrode 21 is formed of a light-transmitting conductive film and the other is formed of a reflective conductive film, a reflection type liquid crystal device can be configured. In a case where the liquid crystal device 100 is a reflection type, light incident from the substrate of one side among the first substrate 10 and the second substrate 20 is modulated while it is reflected by the substrate of the other side and emitted, thereby displaying an image. In a case where the liquid crystal device 100 is a transmission type, light incident from the substrate of one side among the first substrate 10 and the second substrate 20 is modulated while it penetrates the substrate of the other side and is emitted, thereby displaying an image.

The liquid crystal device 100 can be used as a color display device of an electronic apparatus such as a mobile computer or a mobile telephone, and in this case, a color filter (not shown) or a protective film is formed on the second substrate 20. Further, in the liquid crystal device 100, a polarizing film, a phase difference film, a polarizing plate, or the like is disposed in a given direction with respect to the liquid crystal panel 100p depending on the kind of liquid crystal layer 50 which is utilized or differentiation of a normally-white mode and a normally-black mode. Further, the liquid crystal device 100 can be used as light valves for RGB in a projection type display apparatus (liquid crystal projector) which will be described later. In this case, since light of each color decomposed through dichroic mirrors for RGB color separation is incident as projection light into each of the liquid crystal devices 100 for RGB, the color filter is not formed.

In this embodiment, a description is performed focusing on a case where the liquid crystal device 100 is a transmission type liquid crystal device which is used as each of the light valves for RGB in the projection type display apparatus which will be described later, so that light incident from the second substrate 20 penetrates the first substrate 10 and is emitted. Further, in this embodiment, a description is performed focusing on a case where the liquid crystal device 100 includes the liquid crystal panel 100p of a VA mode using a nematic liquid crystal compound, in which dielectric anisotropy is negative, as the liquid crystal layer 50.

Specific Configuration of Pixel

Figure 3A:
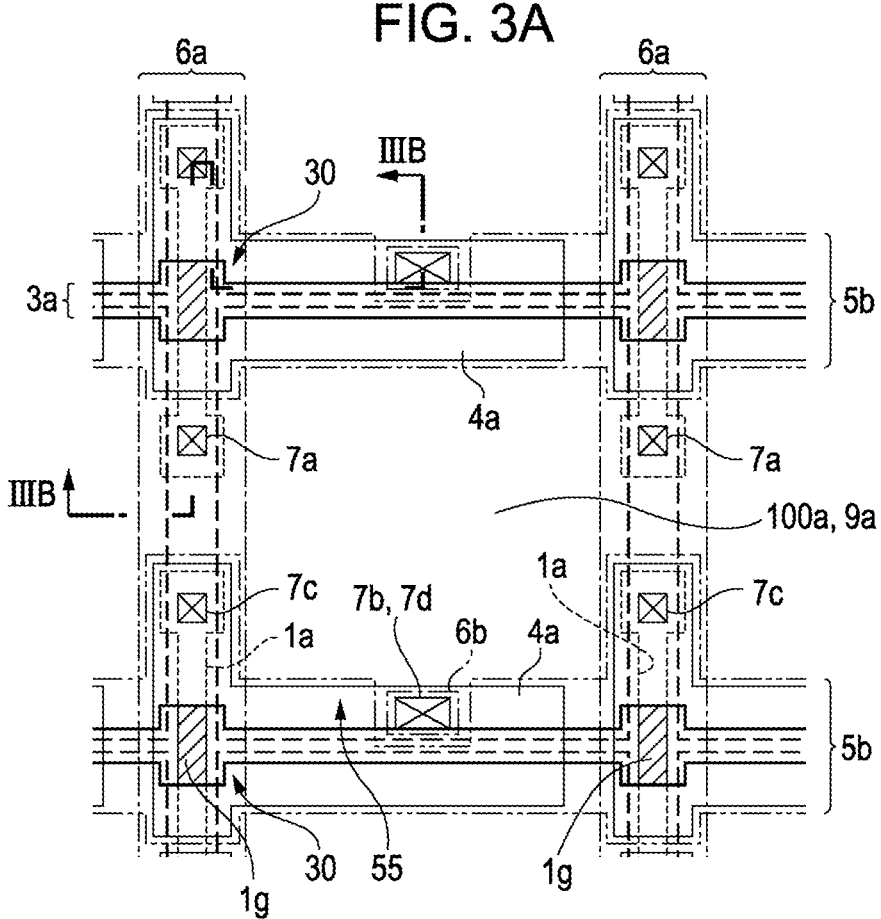
FIGS. 3A and 3B are explanatory diagrams of a pixel of the liquid crystal device with the invention applied thereto.
Figure 3B:
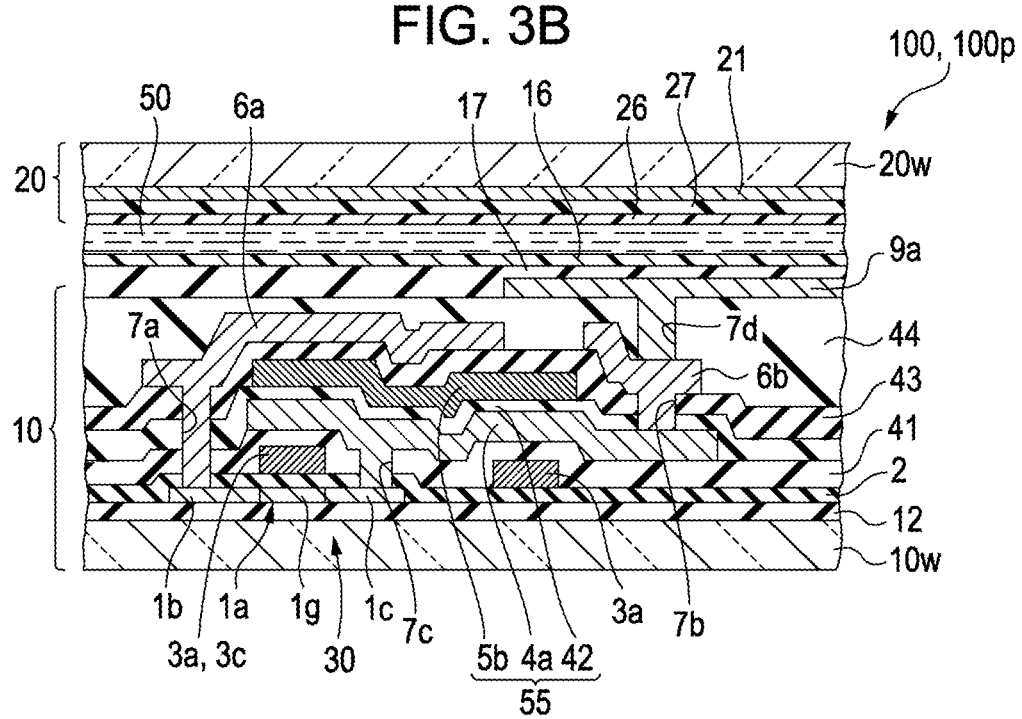

FIGS. 3A and 3B are explanatory diagrams of the pixel of the liquid crystal device 100 with the invention applied thereto, and FIGS. 3A and 3B respectively are a plan view of adjacent pixels in the first substrate 10 used in the liquid crystal device 100 with the invention applied thereto and a cross-sectional view when the liquid crystal device 100 is cut at a position equivalent to the IIIB-IIIB line of FIG. 3A. In addition, in FIG. 3A, a semiconductor layer is indicated by a thin and short dotted line, the scanning line 3a is indicated by a thick solid line, the data line 6a and a thin film formed simultaneously with it are indicated by a dashed-dotted line, the capacitance line 5b is indicated by a two-dot chain line, the pixel electrode 9a is indicated by a thick dashed line, and a lower electrode layer which will be described later is indicated by a thin solid line.

As shown in FIG. 3A, on the first substrate 10, the pixel electrode 9a of a rectangular shape is formed at each of a plurality of pixels 100a and the data line 6a and the scanning line 3a are respectively formed along the vertical and horizontal boundaries of each pixel electrode 9a. The data line 6a and the scanning line 3a respectively extend linearly and the pixel transistor 30 is formed at a region where the data line 6a and the scanning line 3a intersect each other. On the first substrate 10, the capacitance line 5b is formed so as to overlap with the scanning line 3a. In this embodiment, the capacitance line 5b includes a main line portion linearly extending so as to overlap with the scanning line 3a, and a sub-line portion extending so as to overlap with the data line 6a at an intersection portion of the data line 6a and the scanning line 3a.

As shown in FIGS. 3A and 3B, the first substrate 10 is constituted to include the pixel electrode 9a formed on the surface (one face side) of the liquid crystal layer 50 side of a light-transmitting substrate main body 10w such as a quartz substrate or a glass substrate, the pixel transistor 30 for pixel switching, and the alignment film 16, and the second substrate 20 is constituted to include a light-transmitting substrate main body 20w such as a quartz substrate or a glass substrate, the common electrode 21 formed on the surface (one face side) of the liquid crystal layer 50 side of the substrate main body 20w, and the alignment film 26.

In the first substrate 10, the pixel transistor 30 having a semiconductor layer 1a is formed at each of a plurality of pixels 100a. The semiconductor layer 1a has a channel region 1g which faces a gate electrode 3c, which is made of a portion of the scanning line 3a, with a gate insulating layer 2 interposed therebetween, a source region 1b, and a drain region 1c, and the source region 1b and the drain region 1c respectively have a low-concentration region and a high-concentration region. The semiconductor layer 1a is constituted, for example, by a polycrystalline silicon film or the like formed on the substrate main body 10w with a base insulating film 12 interposed therebetween, and the gate insulating layer 2 is made of a silicon oxide film or a silicon nitride film formed by a CVD method or the like. Further, there is also a case where the gate insulating layer 2 has a two-layer structure of a silicon oxide film which is formed by thermally oxidizing the semiconductor layer 1a, and a silicon oxide film or a silicon nitride film formed by a CVD method or the like. For the scanning line 3a, an electrically-conductive polysilicon film, a metal silicide film, or a metal film is used.

A first interlayer insulating film 41 which is made of a silicon oxide film or the like is formed at the upper layer side of the scanning line 3a, and a lower electrode layer 4a is formed on an upper layer of the first interlayer insulating film 41. The lower electrode layer 4a is formed into an approximate L-shape which extends along the scanning line 3a and the data line 6a with the intersecting position of the scanning line 3a and the data line 6a as a base point. The lower electrode layer 4a is made of an electrically-conductive polysilicon film, a metal silicide film, a metal film, or the like and is electrically connected to the drain region 1c through a contact hole 7c.

A dielectric layer 42 which is made of a silicon nitride film or the like is formed at the upper layer side of the lower electrode layer 4a. At the upper layer side of the dielectric layer 42, the capacitance line 5b (an upper electrode layer) is formed so as to face the lower electrode layer 4a with the dielectric layer 42 interposed therebetween, and the retention capacitor 55 is formed by the capacitance line 5b, the dielectric layer 42, and the lower electrode layer 4a. The capacitance line 5b is made of an electrically-conductive polysilicon film, a metal silicide film, a metal film, or the like. Here, the lower electrode layer 4a, the dielectric layer 42, and the capacitance line 5b (the upper electrode layer) are formed at the upper layer side of the pixel transistor 30, thereby overlapping with the pixel transistor 30 in a plan view. For this reason, the retention capacitor 55 is formed at the upper layer side of the pixel transistor 30, thereby overlapping with at least the pixel transistor 30 in a plan view.

A second interlayer insulating film 43 which is made of a silicon oxide film or the like is formed at the upper layer side of the capacitance line 5b, and the data line 6a and a drain electrode 6b are formed on an upper layer of the second interlayer insulating film 43. The data line 6a is electrically connected to the source region 1b through a contact hole 7a. The drain electrode 6b is electrically connected to the lower electrode layer 4a through a contact hole 7b and electrically connected to the drain region 1c through the lower electrode layer 4a. The data line 6a and the drain electrode 6b are made of an electrically-conductive polysilicon film, a metal silicide film, a metal film, or the like.

A third interlayer insulating film 44 which is made of a silicon oxide film or the like is formed at the upper layer sides of the data line 6a and the drain electrode 6b. A contact hole 7d which leads to the drain electrode 6b is formed in the third interlayer insulating film 44. The pixel electrode 9a which is made of a light-transmitting conductive film such as an ITO film is formed on an upper layer of the third interlayer insulating film 44, and the pixel electrode 9a is electrically connected to the drain electrode 6b through the contact hole 7d. In this embodiment, the surface of the third interlayer insulating film 44 is made to be a flat surface.

Here, the dummy pixel electrode 9b (not shown in FIGS. 3A and 3B) described with reference to FIG. 2B is formed on the surface of the third interlayer insulating film 44, and such a dummy pixel electrode 9b is made of a light-transmitting conductive film formed simultaneously with the pixel electrode 9a. Further, the wirings such as the common potential line 5c, the first constant potential line 6s, and the second constant potential line 6t shown in FIG. 1 are made of a conductive film formed simultaneously with the wirings such as the data line 6a, the scanning line 3a, and the capacitance line 5b.

The alignment film 16 is formed on the surface of the pixel electrode 9a. The alignment film 16 is made of a resin film such as polyimide, or an obliquely vapor-deposited film such as a silicon oxide film. In this embodiment, the alignment film 16 is an inorganic alignment film (vertical alignment film) which is made of an obliquely vapor-deposited film such as $SiO_x$ (x<2), $SiO_2$, $TiO_2$, MgO, $Al_2O_3$, $In_2O_3$, $Sb_2O_3$, or $Ta_2O_5$, and a protective film 17 such as a silicon oxide film or a silicon nitride film is formed in an interlayer between the alignment film 16 and the pixel electrode 9a. The protective film 17 has a surface which is a flat surface, and fills a concave portion formed between the pixel electrodes 9a. Accordingly, the alignment film 16 is formed on the flat surface of the protective film 17.

In the second substrate 20, the common electrode 21 is formed on the surface (the face of the side facing the first substrate 10) of the liquid crystal layer 50 side of the light-transmitting substrate main body 20w such as a quartz substrate or a glass substrate and the alignment film 26 is formed so as to cover such a common electrode 21. The alignment film 26 is made of a resin film such as polyimide, or an obliquely vapor-deposited film such as a silicon oxide film, similarly to the alignment film 16. In this embodiment, the alignment film 26 is an inorganic alignment film (vertical alignment film) which is made of an obliquely vapor-deposited film such as $SiO_x$ (x<2), $SiO_2$, $TiO_2$, MgO, $Al_2O_3$, $In_2O_3$, $Sb_2O_3$, or $Ta_2O_5$, and a protective film 27 such as a silicon oxide film or a silicon nitride film is formed in an interlayer between the alignment film 26 and the common electrode 21. The protective film 27 has a surface which is a flat surface, and the alignment film 26 is formed on such a flat surface. The alignment films 16 and 26 vertically align the nematic liquid crystal compounds, in which dielectric anisotropy is negative, used in the liquid crystal layer 50, so that the liquid crystal panel 100p operates in a normally-black VA mode.

In addition, in the liquid crystal device 100 of this embodiment, a complementary transistor circuit having an N-channel driving transistor and a P-channel driving transistor, or the like is constituted in the data line driving circuit 101 and the scanning line driving circuit 104 described with reference to FIGS. 1, 2A, and 2B. Here, the driving transistor is formed using a portion of a manufacturing process of the pixel transistor 30. For this reason, the regions where the data line driving circuit 101 and the scanning line driving circuit 104 are formed in the first substrate 10 also have approximately the same cross-sectional configuration as the cross-sectional configuration shown in FIG. 3B. Therefore, in the liquid crystal device 100, when electrically connecting the dummy pixel electrode 9b or the peripheral electrode, which will be described later, to the constant potential wiring on the lower layer side at the peripheral region 10b, a contact hole formed in an insulating film is utilized.

Configuration of Peripheral Electrode

Figure 4:
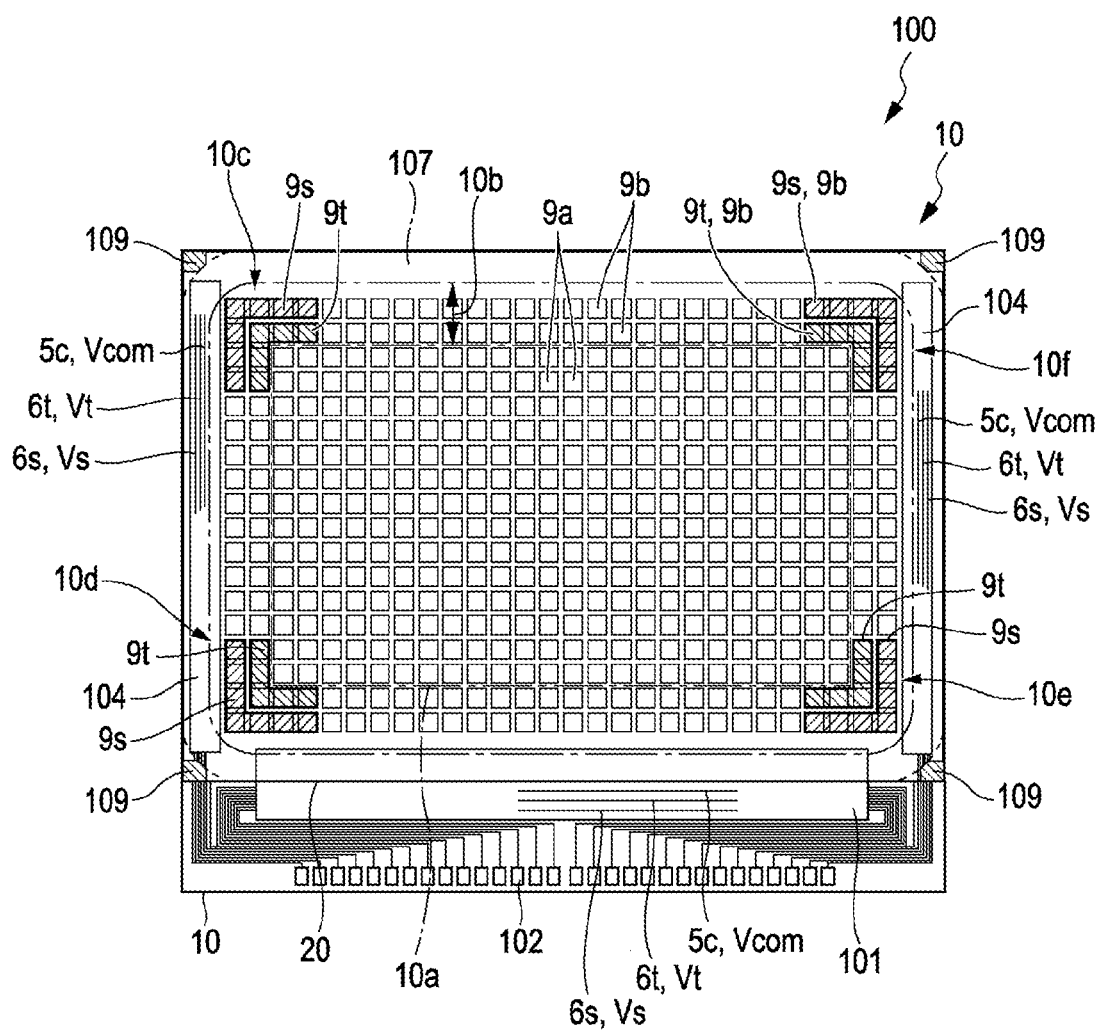
FIG. 4 is an explanatory diagram illustrating the configuration of a first substrate used in a liquid crystal device related to Embodiment 1 of the invention.
Figure 5A:
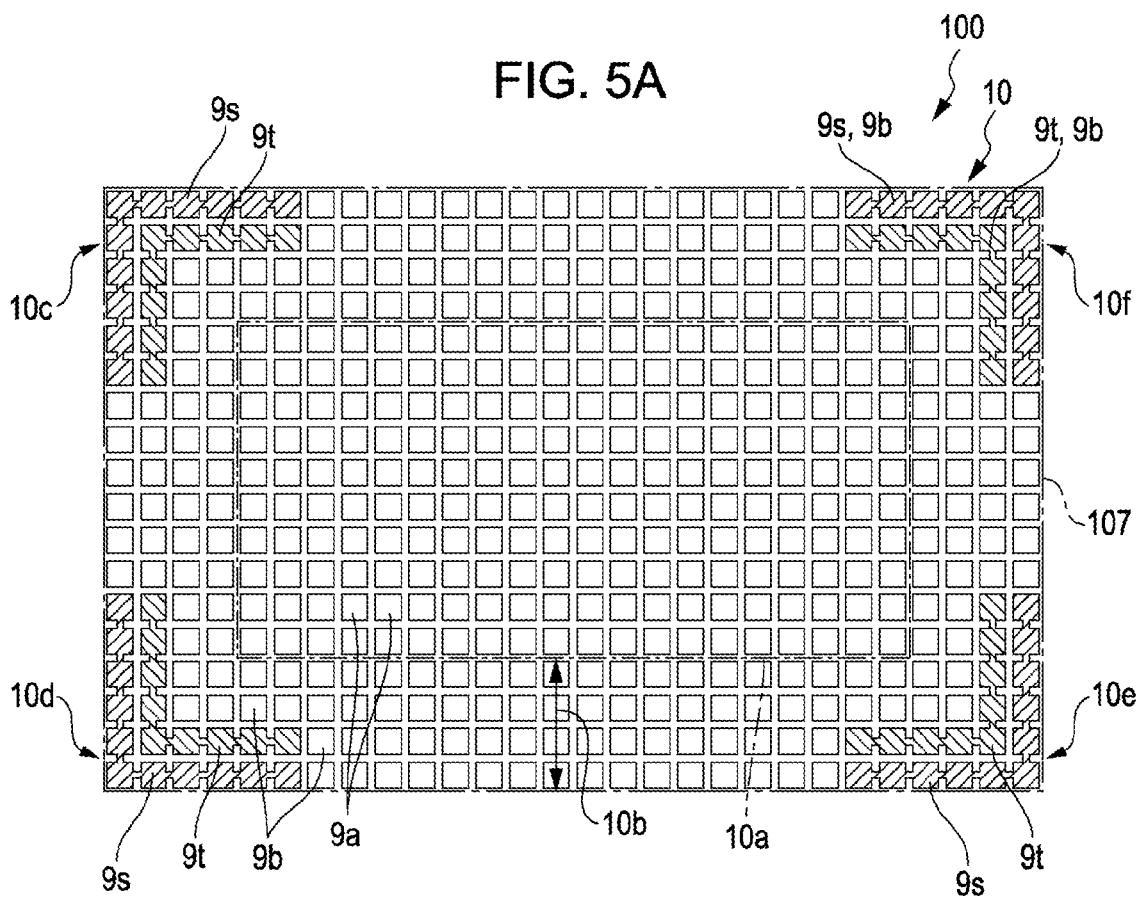
FIGS. 5A and 5B are explanatory diagrams illustrating the configuration of an electrode used in the liquid crystal device related to Embodiment 1 of the invention.
Figure 5B:
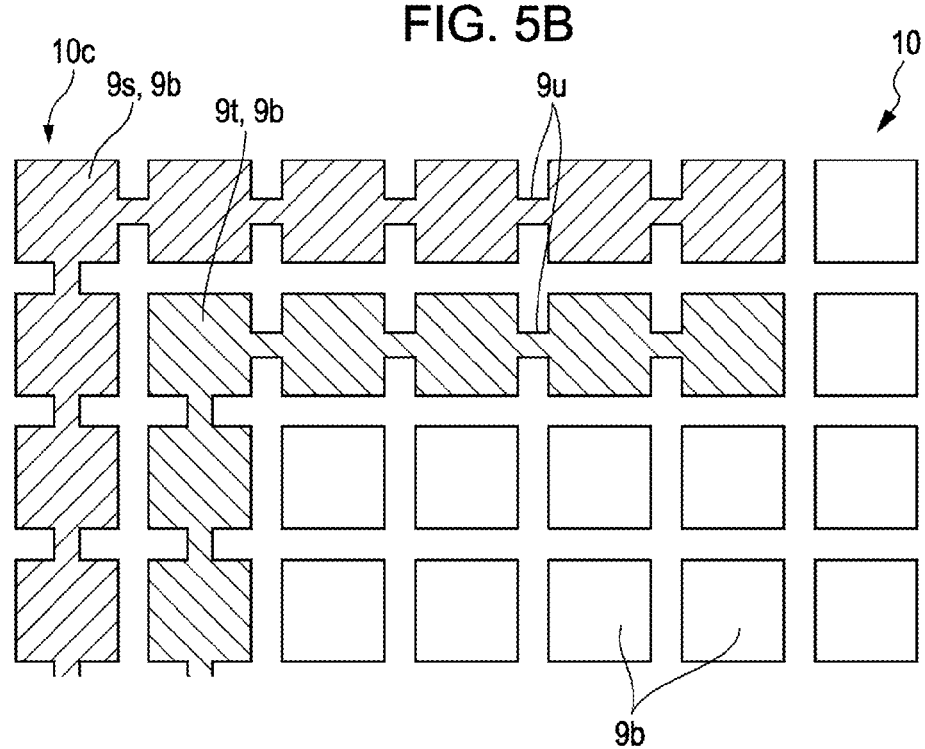

FIG. 4 is an explanatory diagram illustrating the configuration of the first substrate 10 used in the liquid crystal device 100 related to Embodiment 1 of the invention. FIGS. 5A and 5B are explanatory diagrams illustrating the configuration of the electrode used in the liquid crystal device 100 related to Embodiment 1 of the invention. FIGS. 5A and 5B respectively are explanatory diagrams illustrating the entire layout of the electrodes and an explanatory diagram illustrating the enlarged corner portion of the peripheral region. In addition, in FIGS. 4, 5A and 5B, with respect to the number or the like of the pixel electrodes 9a or the dummy pixel electrodes 9b, it is reduced and shown. For example, in FIG. 4, the width dimension of the peripheral region 10b is represented as two rows of dummy pixel electrodes, and in FIGS. 5A and 5B, the width dimension of the peripheral region 10b is represented as four rows of dummy pixel electrodes. Further, in FIG. 4, the outline of the second substrate 20 is also shown.

As shown in FIGS. 4, 5A, and 5B, in the liquid crystal device 100 of this embodiment, at an approximately central position of the first substrate 10, the pixel region 10a in which a plurality of pixel electrodes 9a is arranged, and the peripheral region 10b sandwiched between the pixel region 10a and the seal material 107 are provided, and at the peripheral region 10b, a plurality of dummy pixel electrodes 9b is formed. Further, in the scanning line driving circuit 104 or the data line driving circuit 101, the wirings such as the common potential line 5c with the common potential Vcom applied thereto, the first constant potential line 6s of the high-potential side with the constant potential Vs applied thereto, and the second constant potential line 6t of the low-potential side with the constant potential Vt applied thereto extend, and the peripheral electrodes which will be described below are electrically connected to such wirings.

In this embodiment, some dummy pixel electrodes 9b among the plurality of dummy pixel electrodes 9b are connected to each other through a connection portion 9u formed thinner than the width of the dummy pixel electrode 9b, thereby constituting a first peripheral electrode 9s (a region with diagonal lines rising from the bottom left to the top right described therein in FIGS. 4, 5A, and 5B) and a second peripheral electrode 9t (a region with diagonal lines falling from the top left to the bottom right described therein in FIGS. 4, 5A, and 5B) at positions adjacent to each other. In this embodiment, among the plurality of dummy pixel electrodes 9b, the plurality of dummy pixel electrodes 9b which is located at each of four corner regions 10c, 10d, 10e, and 10f each sandwiched between each corner portion of the pixel region 10a and each corner region of the seal material 107 are connected to each other through the connection portion 9u, thereby constituting the first peripheral electrode 9s and the second peripheral electrode 9t. In this embodiment, the second peripheral electrode 9t is formed into an L-shape which extends along the corner portion of the pixel region 10a in each of the corner regions 10c, 10d, 10e, and 10f, and the first peripheral electrode 9s is formed into an L-shape which extends being spaced from the second peripheral electrode 9t and along the outer edge of the second peripheral electrode 9t in each of the corner regions 10c, 10d, 10e, and 10f. In addition, the positions of the first peripheral electrode 9s and the second peripheral electrode 9t may be changed to each other, and a configuration may be adopted in which the first peripheral electrode 9s is formed into an L-shape which extends along the corner portion of the pixel region 10a in each of the corner regions 10c, 10d, 10e, and 10f and the second peripheral electrode 9t is formed into an L-shape which extends along the outer edge of the first peripheral electrode 9s in each of the corner regions 10c, 10d, 10e, and 10f. In this embodiment, the first peripheral electrode 9s and the second peripheral electrode 9t are provided corresponding to each of the corner regions 10c, 10d, 10e, and 10f. Further, in this embodiment, a configuration is made such that the number of dummy pixel electrodes 9b constituting the first peripheral electrode 9s is greater than the number of dummy pixel electrodes 9b constituting the second peripheral electrode 9t.

Here, the first peripheral electrode 9s is electrically connected to the first constant potential line 6s of the high-potential side with the constant potential Vs applied thereto, and the second peripheral electrode 9t is electrically connected to the second constant potential line 6t of the low-potential side with the constant potential Vt applied thereto. Further, among the dummy pixel electrodes 9b, the dummy pixel electrodes 9b which are not used as the first peripheral electrode 9s and the second peripheral electrode 9t are in a floating state without being applied with an electric potential.

In the liquid crystal device 100 of this embodiment, in inversion driving of the liquid crystal layer 50, the common potential Vcom applied to the common electrode 21 is constant at 0 V and the polarity of a signal which is applied the pixel electrode 9a is inverted. Further, the common potential Vcom applied to the common electrode 21, the constant potential Vs applied to the first peripheral electrode 9s, and the constant potential Vt applied to the second peripheral electrode 9t have the relationship of the constant potential Vt<Vcom=0 V<the constant potential Vs. Accordingly, the constant potential Vs applied to the first peripheral electrode 9s is different from the common potential Vcom applied to the common electrode 21. Further, the constant potential Vt applied to the second peripheral electrode 9t is different from the constant potential Vs applied to the first peripheral electrode 9s and also different from the common potential Vcom applied to the common electrode 21.

In the liquid crystal device 100 configured in this manner, during driving of the liquid crystal device 100, it is in a state where the common potential Vcom is applied to the common electrode 21, the constant potential Vs is applied to the first peripheral electrode 9s, and the constant potential Vt is applied to the second peripheral electrode 9t. For this reason, as described below, even if ionic impurities mixed in at the time of liquid crystal injection when manufacturing the liquid crystal device 100 or ionic impurities eluted from the seal material 107 are present in the liquid crystal layer 50, since such ionic impurities can be drawn to the peripheral region 10b, deterioration of display quality such as burning (staining) or the like of an image caused by ionic impurities does not arise.

That is, even if the ionic impurities mixed in at the time of liquid crystal injection when manufacturing the liquid crystal device 100 or the ionic impurities eluted from the seal material 107 are present in the liquid crystal layer 50, if energization for testing is performed in the liquid crystal device 100, it is possible to draw the ionic impurities from the pixel region 10a toward the corner regions 10c, 10d, 10e, and 10f, thereby making them be retained there. Further, if a display operation is carried out in the liquid crystal device 100 after manufacturing of the liquid crystal device 100, it is possible to draw the ionic impurities from the pixel region 10a toward the corner regions 10c, 10d, 10e, and 10f, thereby making them be retained there.

More specifically, if at the second substrate 20 side, the common potential Vcom is applied to the common electrode 21 and at the first substrate 10 side, the constant potentials Vs and Vt are applied to the first peripheral electrode 9s and the second peripheral electrode 9t, electric fields in the layer thickness direction of the liquid crystal layer 50 are generated between the first peripheral electrode 9s and the common electrode 21 and between the second peripheral electrode 9t and the common electrode 21. Further, an electric field in the lateral direction is generated between the first peripheral electrode 9s and the second peripheral electrode 9t. For this reason, even if the ionic impurities mixed in at the time of liquid crystal injection or the ionic impurities eluted from the seal material 107 are present within the liquid crystal layer 50, such ionic impurities are efficiently drawn to the first peripheral electrode 9s, the second peripheral electrode 9t, a portion facing the first peripheral electrode 9s in the common electrode 21, and a portion facing the second peripheral electrode 9t in the common electrode 21. Further, when the liquid crystal device 100 performs a display operation, the positions of the liquid crystal molecules used in the liquid crystal layer 50 are switched, and even in a case where by minute fluctuation of the liquid crystal molecules accompanying it, the ionic impurities within the liquid crystal layer 50 are apt to be concentrated at the corner portions of the pixel region 10a, since the ionic impurities are drawn to the first peripheral electrode 9s, the second peripheral electrode 9t, a portion facing the first peripheral electrode 9s in the common electrode 21, and a portion facing the second peripheral electrode 9t in the common electrode 21 and retained in a state where they are aggregated there, the ionic impurities do not aggregate in the pixel region 10a. Further, even in a case where by imbalance of a direct-current component when performing inversion driving of the liquid crystal device 100, the ionic impurities within the liquid crystal layer 50 are apt to be concentrated at the corner portions of the pixel region 10a, since the ionic impurities are drawn to the first peripheral electrode 9s, the second peripheral electrode 9t, a portion facing the first peripheral electrode 9s in the common electrode 21, and a portion facing the second peripheral electrode 9t in the common electrode 21 and retained in a state where they are aggregated there, the ionic impurities do not aggregate in the pixel region 10a.

The Main Effect of this Embodiment

As described above, in the liquid crystal device 100 of this embodiment, since the first peripheral electrode 9s with the constant potential Vs different from that of the common electrode 21 applied thereto is provided at the peripheral region 10b of the first substrate 10, an electric field in the layer thickness direction of the liquid crystal layer 50 is generated between the first peripheral electrode 9s and the common electrode 21. For this reason, even in a case where the ionic impurities mixed in at the time of liquid crystal injection or the ionic impurities eluted from the seal material are present within the liquid crystal layer and such ionic impurities aggregate at an end portion of the pixel region 10a in accordance with liquid crystal driving, the ionic impurities are efficiently drawn to the first peripheral electrode 9s or a portion facing the first peripheral electrode 9s in the common electrode 21. Further, since an electric potential which is applied to the first peripheral electrode 9s is a constant potential, the ionic impurities drawn to the first peripheral electrode 9s or a portion facing the first peripheral electrode 9s in the common electrode 21 are retained in a state where they are aggregated there, so that the ionic impurities do not exude to the pixel region 10a. Therefore, deterioration of display quality due to the ionic impurities can be reliably prevented. In addition, since it is acceptable if the first peripheral electrode 9s is provided only at the first substrate 10 side and there is no need to provide a peripheral electrode at the second substrate 20 side, it is acceptable if power feeding to the second substrate 20 is performed with respect to the common electrode 21 only, so that deterioration of display quality due to the ionic impurities can be reliably prevented with a simple configuration such as there being no need to add inter-substrate conduction.

Further, at the peripheral region 10b, the second peripheral electrode 9t with the constant potential Vt different from that of the first peripheral electrode 9s applied thereto is provided at a position adjacent to the first peripheral electrode 9s. For this reason, since a transverse electric field is generated between the first peripheral electrode 9s and the second peripheral electrode 9t, it is possible to efficiently draw in the ionic impurities with use of such a transverse electric field, thereby making the ionic impurities be retained in a state where they are aggregated there. Therefore, deterioration of display quality due to the ionic impurities can be reliably prevented.

In addition, the strength relationship between the constant potential Vs which is applied to the first peripheral electrode 9s, the constant potential Vt which is applied to the second peripheral electrode 9t, and the common potential Vcom which is applied to the common electrode 21 is the condition of the second peripheral electrode 9t<the common electrode 21<the first peripheral electrode 9s, and the constant potential Vt which is applied to the second peripheral electrode 9t and the common potential Vcom which is applied to the common electrode 21 are different from each other. For this reason, since an electric field in the layer thickness direction of the liquid crystal layer 50 is also generated between the second peripheral electrode 9t and the common electrode 21 similarly to between the first peripheral electrode 9s and the common electrode 21, the ionic impurities are efficiently drawn to the second peripheral electrode 9t or a portion facing the second peripheral electrode 9t in the common electrode 21. Further, anionic impurities and cationic impurities are respectively drawn to the first peripheral electrode 9s and the second peripheral electrode 9t and retained in a state where they are aggregated there. Therefore, deterioration of display quality due to the ionic impurities can be reliably prevented. Further, since it is acceptable if constant potentials (the constant potentials Vs and Vt) are applied to the first peripheral electrode 9s and the second peripheral electrode 9t, deterioration of display quality due to the ionic impurities can be reliably prevented by a simple circuit configuration.

Furthermore, since the first peripheral electrodes 9s and the second peripheral electrodes 9t are provided at each of the corner regions 10c, 10d, 10e, and 10f each sandwiched between each corner portion of the pixel region 10a and each corner portion of the seal material 107, deterioration of display quality due to the ionic impurities can be reliably prevented. That is, since at the time of liquid crystal driving, the ionic impurities are easily eccentrically located at the corner portions of the pixel region 10a, if the first peripheral electrodes 9s and the second peripheral electrodes 9t are disposed at the corner regions 10c, 10d, 10e, and 10f, it is possible to efficiently draw the ionic impurities from the pixel region 10a, thereby making the ionic impurities be retained in a state where they are aggregated there.

Further, in a case where the corner portion of the seal material 107 is made to be a curved arc shape, since at the outside of the corner portion of the pixel region 10a, the width dimension of the peripheral region 10b often becomes narrow compared to other places, the aggregated ionic impurities tend to easily protrude to the corner portion of the pixel region 10a. However, if the first peripheral electrodes 9s and the second peripheral electrodes 9t are disposed at the corner regions 10c, 10d, 10e, and 10f, it is possible to efficiently draw in the ionic impurities, thereby making the ionic impurities be retained in a state where they are aggregated there. Therefore, deterioration of display quality due to the ionic impurities can be reliably prevented.

Particularly, in the case of the liquid crystal device 100 in a VA mode, the ionic impurities are easily eccentrically located at the diagonal corner regions (for example, the corner regions 10c and 10e) corresponding to a pre-tilt orientation, by a flow when the liquid crystal molecules are switched between a vertical position and a horizontally prostrated position. However, as in this embodiment, if the first peripheral electrodes 9s and the second peripheral electrodes 9t are provided at least at the corner regions 10c and 10e, there is an advantage that it is possible to aggregate the ionic impurities which are eccentrically located at the corner regions 10c and 10e due to the flow when the positions of the liquid crystal molecules are switched, at the peripheral region 10b, thereby making the ionic impurities be retained there.

Further, since the first peripheral electrode 9s and the second peripheral electrode 9t have an L-shape, the area is correspondingly wide. Accordingly, it is possible to make the drawn in ionic impurities be retained in large amounts in an aggregated state. Therefore, since the ionic impurities do not exude to the pixel region 10a, deterioration of display quality due to the ionic impurities can be reliably prevented.

In addition, in a case where eccentric location of the ionic impurities due to the flow when the positions of the liquid crystal molecules are switched is a principal cause of deterioration of display quality, a configuration may be adopted in which the first peripheral electrode 9s and the second peripheral electrode 9t are provided only at the diagonal corner regions corresponding to a pre-tilt orientation, among the four corner regions 10c to 10f.

Embodiment 2

Figure 6:
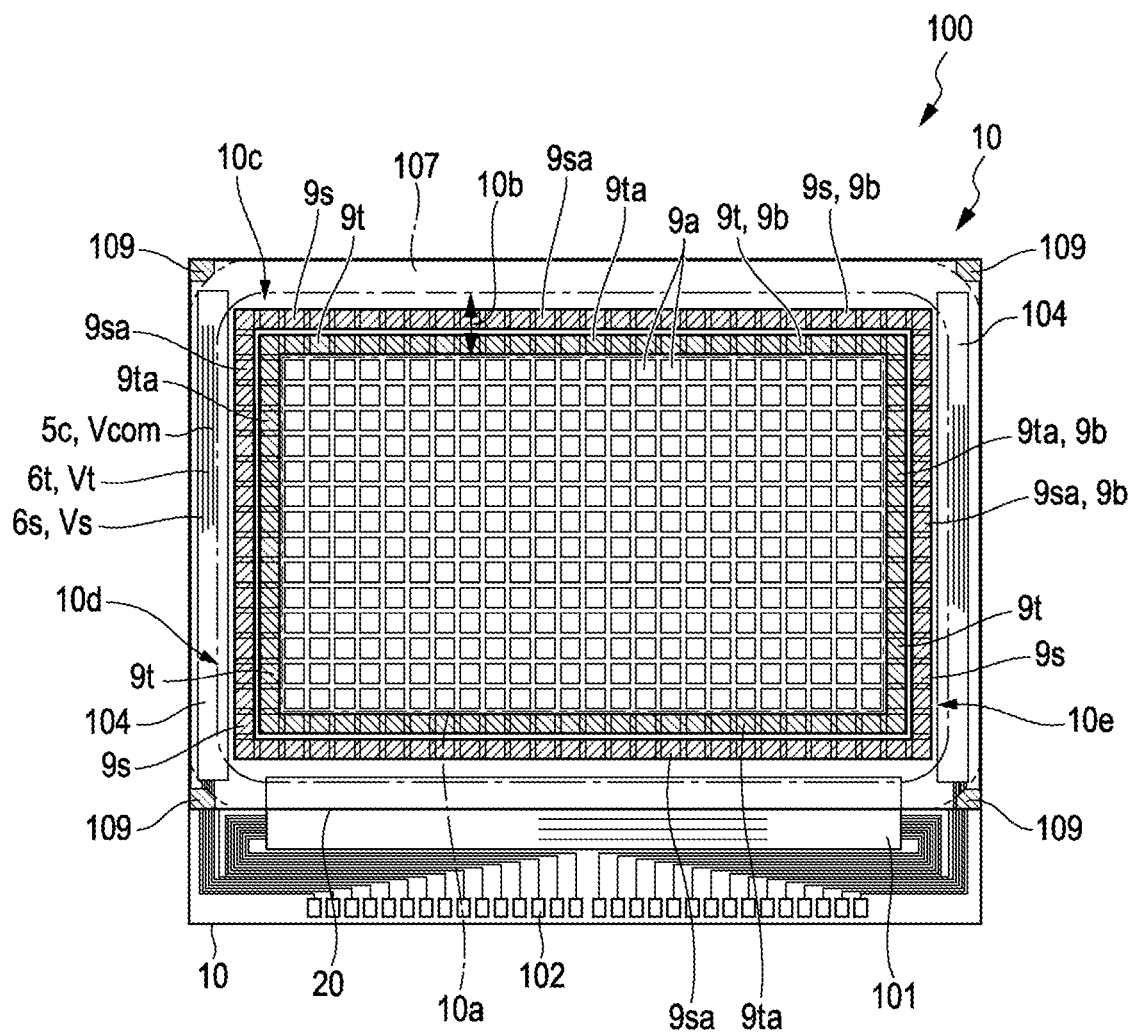
FIG. 6 is an explanatory diagram illustrating the configuration of the first substrate used in a liquid crystal device related to Embodiment 2 of the invention.
Figure 7A:
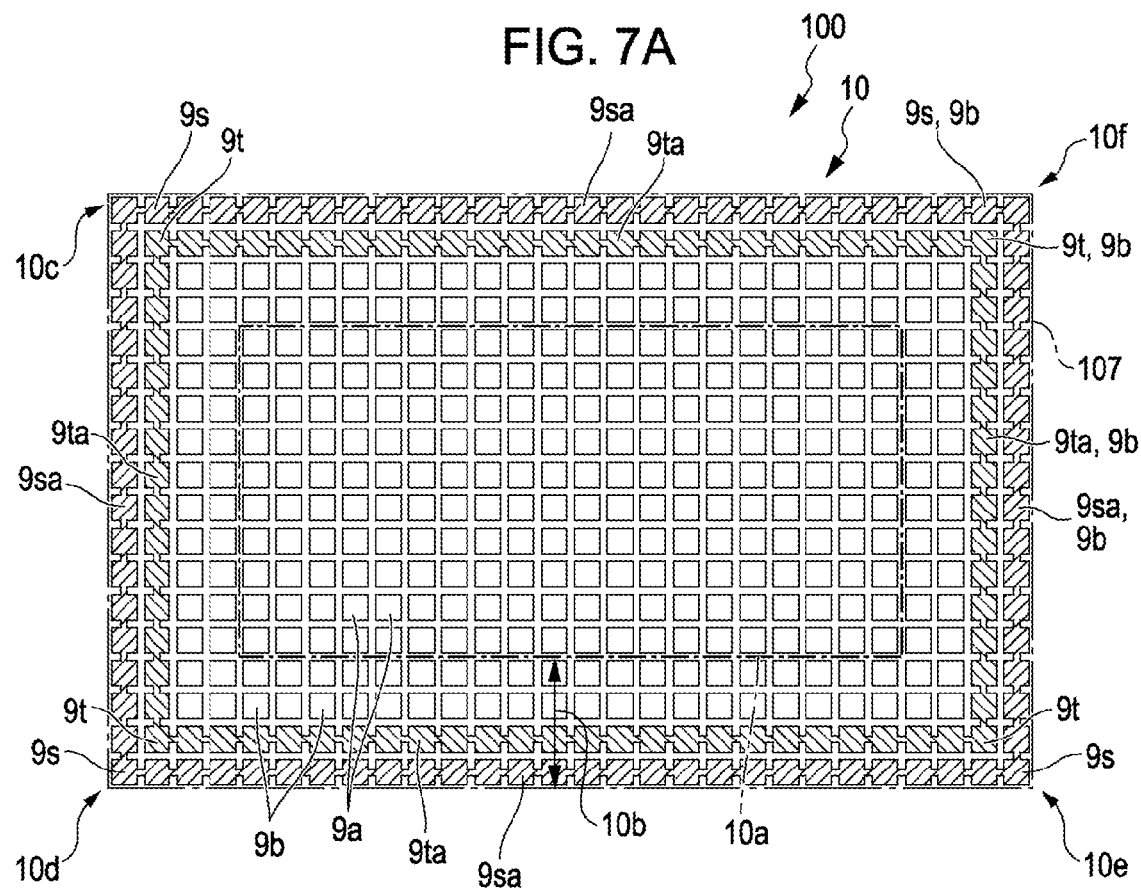
FIGS. 7A and 7B are explanatory diagrams illustrating the configuration of the electrode used in the liquid crystal device related to Embodiment 2 of the invention.
Figure 7B:
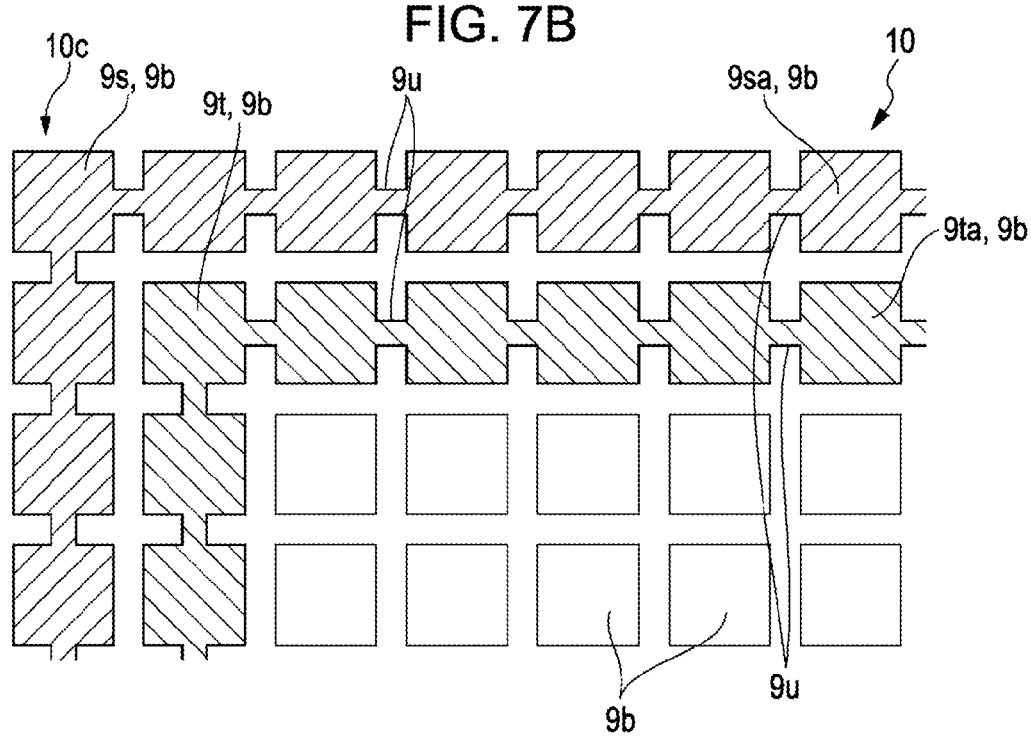

FIG. 6 is an explanatory diagram illustrating the configuration of the first substrate 10 used in the liquid crystal device 100 related to Embodiment 2 of the invention. FIGS. 7A and 7B are explanatory diagrams illustrating the configuration of the electrode used in the liquid crystal device 100 related to Embodiment 2 of the invention and FIGS. 7A and 7B respectively are an explanatory diagram illustrating the entire layout of the electrodes and an explanatory diagram illustrating the enlarged corner portion of the peripheral region. In addition, in FIGS. 6, 7A and 7B, with respect to the number or the like of the pixel electrodes 9a or the dummy pixel electrodes 9b, it is reduced and shown. For example, in FIG. 6, the width dimension of the peripheral region 10b is represented as two rows of dummy pixel electrodes, and in FIGS. 7A and 7B, the width dimension of the peripheral region 10b is represented as four rows of dummy pixel electrodes. Further, in FIG. 6, the outline of the second substrate 20 is also shown. Further, since the basic configuration of this embodiment is the same as that of Embodiment 1, a common portion is denoted by the same reference numeral and explanation thereof is omitted.

As shown in FIGS. 6, 7A, and 7B, also in the liquid crystal device 100 of this embodiment, similarly to Embodiment 1, at an approximately central position of the first substrate 10, the pixel region 10a in which a plurality of pixel electrodes 9a is arranged, and the peripheral region 10b sandwiched between the pixel region 10a and the seal material 107 are provided, and at the peripheral region 10b, the dummy pixel electrodes 9b are formed.

In this embodiment, similarly to Embodiment 1, among a plurality of dummy pixel electrodes 9b, some dummy pixel electrodes 9b which are located at the four corner regions 10c, 10d, 10e, and 10f of the peripheral region 10b are connected to each other through the connection portion 9u, thereby constituting the first peripheral electrode 9s and the second peripheral electrode 9t. In this embodiment, the first peripheral electrode 9s and the second peripheral electrode 9t are formed into an L-shape extending along the corner portion of the pixel region 10a and are adjacent to each other.

Further, the first peripheral electrodes 9s formed at adjacent corner regions among the four corner regions 10c, 10d, 10e, and 10f are connected to each other by a first extension portion 9sa extending a side portion of the pixel region 10a, and the second peripheral electrodes 9t formed at the corner regions adjacent to each other are connected to each other by a second extension portion 9ta extending the side portion of the pixel region 10a. A structure is made in which the first extension portion 9sa and the second extension portion 9ta are disposed along the side portion of the pixel region 10a and the dummy pixel electrodes 9b are connected to each other through the connection portion 9u.

Further in the liquid crystal device 100 configured in this manner, similarly to Embodiment 1, the first peripheral electrode 9s is electrically connected to the first constant potential line 6s of the high-potential side with the constant potential Vs applied thereto, and the second peripheral electrode 9t is electrically connected to the second constant potential line 6t of the low-potential side with the constant potential Vt applied thereto. Further, among the dummy pixel electrodes 9b, the dummy pixel electrodes 9b which are not used as the first peripheral electrode 9s and the second peripheral electrode 9t are in a floating state without being applied with an electric potential. Further, in the liquid crystal device 100, the liquid crystal layer 50 performs inversion driving. However, the common potential Vcom applied to the common electrode 21 is constant at 0 V. Further, the common potential Vcom applied to the common electrode 21, the constant potential Vs applied to the first peripheral electrode 9s, and the constant potential Vt applied to the second peripheral electrode 9t are in the relationship of the constant potential Vt<the common potential Vcom=0 V<the constant potential Vs.

Accordingly, similarly to Embodiment 1, even if the ionic impurities mixed in at the time of liquid crystal injection when manufacturing the liquid crystal device 100 or the ionic impurities eluted from the seal material 107 are present in the liquid crystal layer 50, such ionic impurities are efficiently drawn to the first peripheral electrode 9s, the second peripheral electrode 9t, a portion facing the first peripheral electrode 9s in the common electrode 21, and a portion facing the second peripheral electrode 9t in the common electrode 21 and retained in a state where they are aggregated there. Therefore, since the ionic impurities do not exude to the pixel region 10a, the same effects as those in Embodiment 1, such as enabling deterioration of display quality due to the ionic impurities to be reliably prevented, are obtained.

Modified Example of Embodiment 2

Figure 8A:
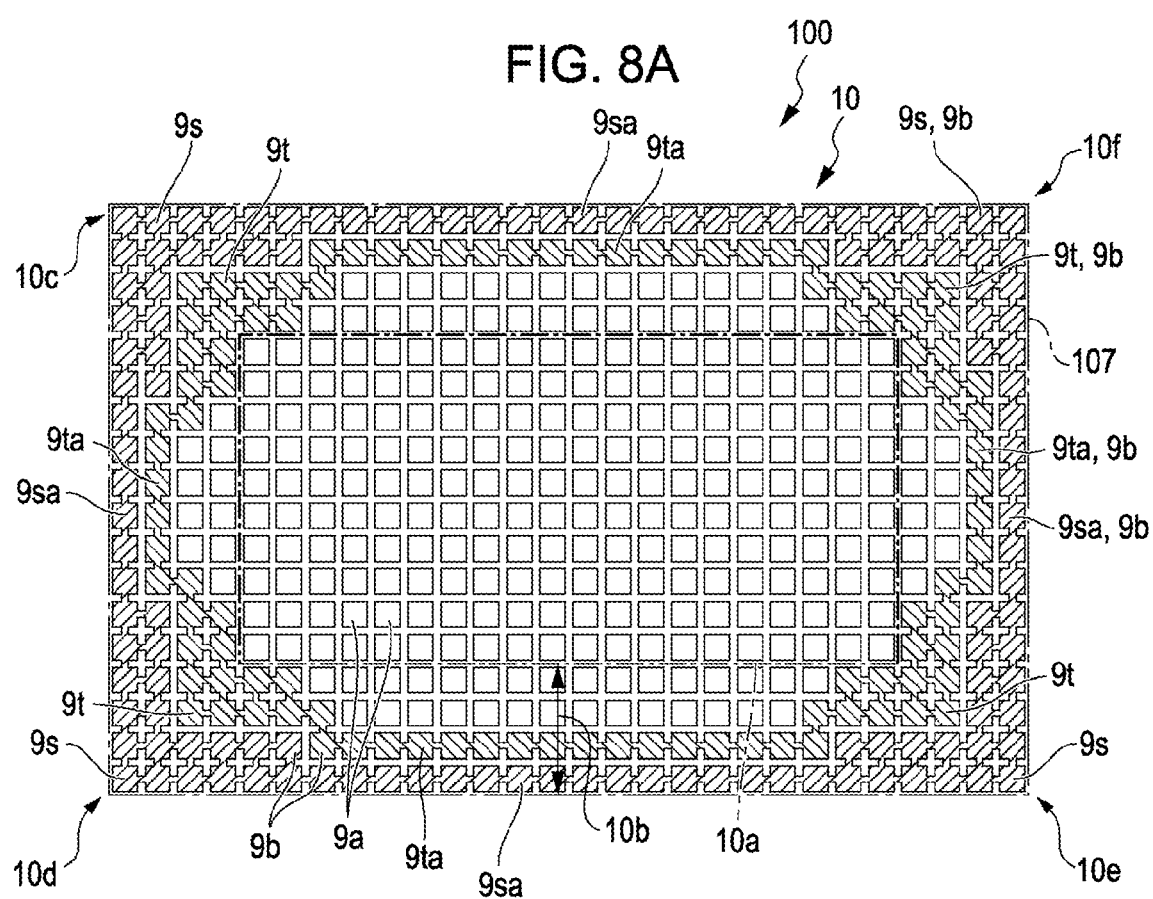
FIGS. 8A and 8B are explanatory diagrams illustrating the configuration of the electrode used in a liquid crystal device related to a modified example of Embodiment 2 of the invention.
Figure 8B:
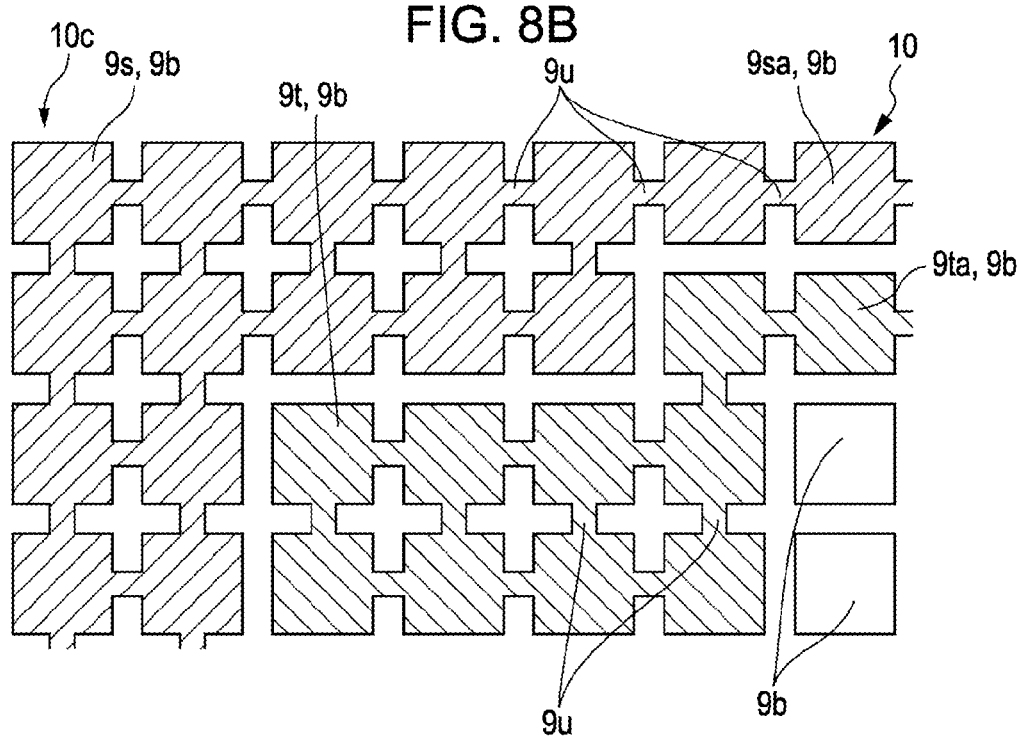

FIGS. 8A and 8B are explanatory diagrams illustrating the configuration of the electrode used in the liquid crystal device 100 related to a modified example of Embodiment 2 of the invention, and FIGS. 8A and 8B respectively are an explanatory diagram illustrating the entire layout of the electrodes and an explanatory diagram illustrating the enlarged corner portion of the peripheral region. In addition, since the basic configuration of this embodiment is the same as that of Embodiment 2, a common portion is denoted by the same reference numeral and explanation thereof is omitted.

As shown in FIGS. 8A and 8B, also with the liquid crystal device 100 of this embodiment, similarly to Embodiment 1, at an approximately central position of the first substrate 10, the pixel region 10a in which a plurality of pixel electrodes 9a is arranged, and the peripheral region 10b sandwiched between the pixel region 10a and the seal material 107 are provided, and at the peripheral region 10b, the dummy pixel electrodes 9b are formed. Further, among a plurality of dummy pixel electrodes 9b, some dummy pixel electrodes 9b which are located at the four corner regions 10c, 10d, 10e, and 10f of the peripheral region 10b are connected to each other through the connection portion 9u, thereby constituting the first peripheral electrode 9s and the second peripheral electrode 9t. Further, also with the liquid crystal device 100 of this embodiment, similarly to Embodiment 2, the first peripheral electrodes 9s formed at adjacent corner regions among the four corner regions 10c, 10d, 10e, and 10f are connected to each other by the first extension portion 9sa which extends along the side portion of the pixel region 10a, and the second peripheral electrodes 9t formed at the corner regions adjacent to each other are connected to each other by the second extension portion 9ta which extends along the side portion of the pixel region 10a. Here, the first extension portion 9sa and the second extension portion 9ta have a structure in which the dummy pixel electrodes 9b arranged along the side portion of the pixel region 10a are connected to each other through the connection portion 9u.

Further, also in the liquid crystal device 100 of this embodiment, similarly to Embodiments 1 and 2, the first peripheral electrode 9s is electrically connected to the first constant potential line 6s of the high-potential side with the constant potential Vs applied thereto, and the second peripheral electrode 9t is electrically connected to the second constant potential line 6t of the low-potential side with the constant potential Vt applied thereto. Further, among the dummy pixel electrodes 9b, the dummy pixel electrodes 9b which are not used as the first peripheral electrode 9s and the second peripheral electrode 9t are in a floating state without being applied with an electric potential. Further, in the liquid crystal device 100, the liquid crystal layer 50 performs inversion driving. However, the common potential Vcom applied to the common electrode 21 is constant at 0 V. Further, the common potential Vcom applied to the common electrode 21, the constant potential Vs applied to the first peripheral electrode 9s, and the constant potential Vt applied to the second peripheral electrode 9t have the relationship of the constant potential Vt<the common potential Vcom=0 V<the constant potential Vs. Accordingly, also in this embodiment, similarly to Embodiments 1 and 2, even if the ionic impurities mixed in at the time of liquid crystal injection when manufacturing the liquid crystal device 100 or the ionic impurities eluted from the seal material 107 are present in the liquid crystal layer 50, such ionic impurities are efficiently drawn to the first peripheral electrode 9s, the second peripheral electrode 9t, a portion facing the first peripheral electrode 9s in the common electrode 21, and a portion facing the second peripheral electrode 9t in the common electrode 21 and retained in a state where they are aggregated there. Therefore, since the ionic impurities do not exude to the pixel region 10a, the same effects as those in Embodiments 1 and 2, such as enabling deterioration of display quality due to the ionic impurities to be reliably prevented, can be obtained.

Here, the width dimensions of the first peripheral electrodes 9s which are located at the corner regions 10c, 10d, 10e, and 10f of the peripheral region 10b are larger than the width dimension of the first extension portion 9sa, and the width dimensions of the second peripheral electrodes 9t which are located at the corner regions 10c, 10d, 10e, and 10f are larger than the width dimension of the second extension portion 9ta. That is, the dimension (and the formed area) between the pixel region 10a and the seal material 107 of the first peripheral electrodes 9s and the second peripheral electrodes 9t in each of the corner regions 10c, 10d, 10e, and 10f is formed thicker than the dimension (and the formed area) between the pixel region 10a and the seal material 107 in the region other than the corner region. A difference between such width dimensions depends on the number of dummy pixel electrodes 9b used to configure the first peripheral electrode 9s, the first extension portion 9sa, the second peripheral electrode 9t, and the second extension portion 9ta.

According to the liquid crystal device 100 configured in this manner, since the areas of the first and second peripheral electrodes 9s and 9t which are located at each of the corner regions 10c, 10d, 10e, and 10f of the peripheral region 10b are wide, it is possible to make the drawn in ionic impurities be retained in large amounts in an aggregated state. Therefore, since the ionic impurities do not exude to the pixel region 10a, deterioration of display quality due to the ionic impurities can be reliably prevented.

Embodiment 3

Figure 9:
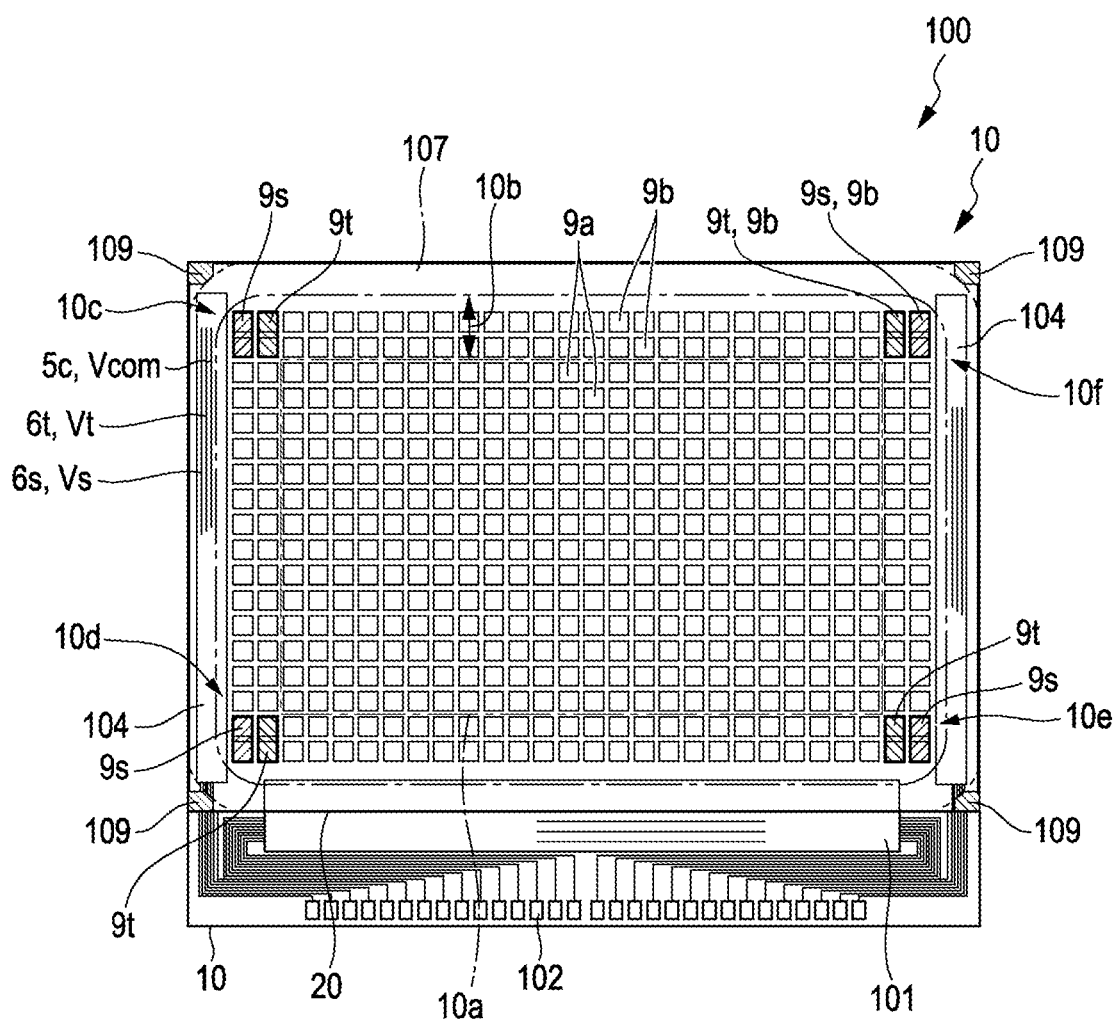
FIG. 9 is an explanatory diagram illustrating the configuration of the first substrate used in a liquid crystal device related to Embodiment 3 of the invention.

FIG. 9 is an explanatory diagram illustrating the configuration of the first substrate 10 used in the liquid crystal device 100 related to Embodiment 3 of the invention. In addition, in FIG. 9, the outline of the second substrate 20 is also shown. Further, since the basic configuration of this embodiment is the same as that of Embodiment 1, a common portion is denoted by the same reference numeral and explanation thereof is omitted.

As shown in FIG. 9, also with the liquid crystal device 100 of this embodiment, similarly to Embodiment 1, at an approximately central position of the first substrate 10, the pixel region 10a in which a plurality of pixel electrodes 9a is arranged, and the peripheral region 10b sandwiched between the pixel region 10a and the seal material 107 are provided, and at the peripheral region 10b, the dummy pixel electrodes 9b are formed. Further, among a plurality of dummy pixel electrodes 9b, some dummy pixel electrodes 9b which are located at the four corner regions 10c, 10d, 10e, and 10f of the peripheral region 10b are connected to each other through the connection portion, thereby constituting the first peripheral electrode 9s and the second peripheral electrode 9t.

Here, the first peripheral electrode 9s and the second peripheral electrode 9t are provided in a pair and in a shape linearly extending in a stripe shape, not an L-shape. In this example, the number of dummy pixel electrodes 9b constituting the first peripheral electrode 9s and the number of dummy pixel electrodes 9b constituting the second peripheral electrode 9t are made to be the same.

Also with the liquid crystal device 100 configured in this manner, similarly to Embodiment 1, the first peripheral electrode 9s is electrically connected to the first constant potential line 6s of the high-potential side with the constant potential Vs applied thereto, and the second peripheral electrode 9t is electrically connected to the second constant potential line 6t of the low-potential side with the constant potential Vt applied thereto. Further, among the dummy pixel electrodes 9b, the dummy pixel electrodes 9b which are not used as the first peripheral electrode 9s and the second peripheral electrode 9t are in a floating state without being applied with an electric potential. Further, in the liquid crystal device 100, the liquid crystal layer 50 performs inversion driving. However, the common potential Vcom applied to the common electrode 21 is constant at 0 V. Further, the common potential Vcom applied to the common electrode 21, the constant potential Vs applied to the first peripheral electrode 9s, and the constant potential Vt applied to the second peripheral electrode 9t have the relationship of the constant potential Vt<the common potential Vcom=0 V<the constant potential Vs. Accordingly, also in this embodiment, similarly to Embodiment 1, even if the ionic impurities mixed in at the time of liquid crystal injection when manufacturing the liquid crystal device 100 or the ionic impurities eluted from the seal material 107 are present in the liquid crystal layer 50, such ionic impurities are efficiently drawn to the first peripheral electrode 9s, the second peripheral electrode 9t, a portion facing the first peripheral electrode 9s in the common electrode 21, and a portion facing the second peripheral electrode 9t in the common electrode 21 and retained in a state where they are aggregated there. Therefore, since the ionic impurities do not exude to the pixel region 10a, the same effects as those in Embodiments 1 and 2, such as enabling deterioration of display quality due to the ionic impurities to be reliably prevented, can be obtained.

Embodiment 4

Figure 10:
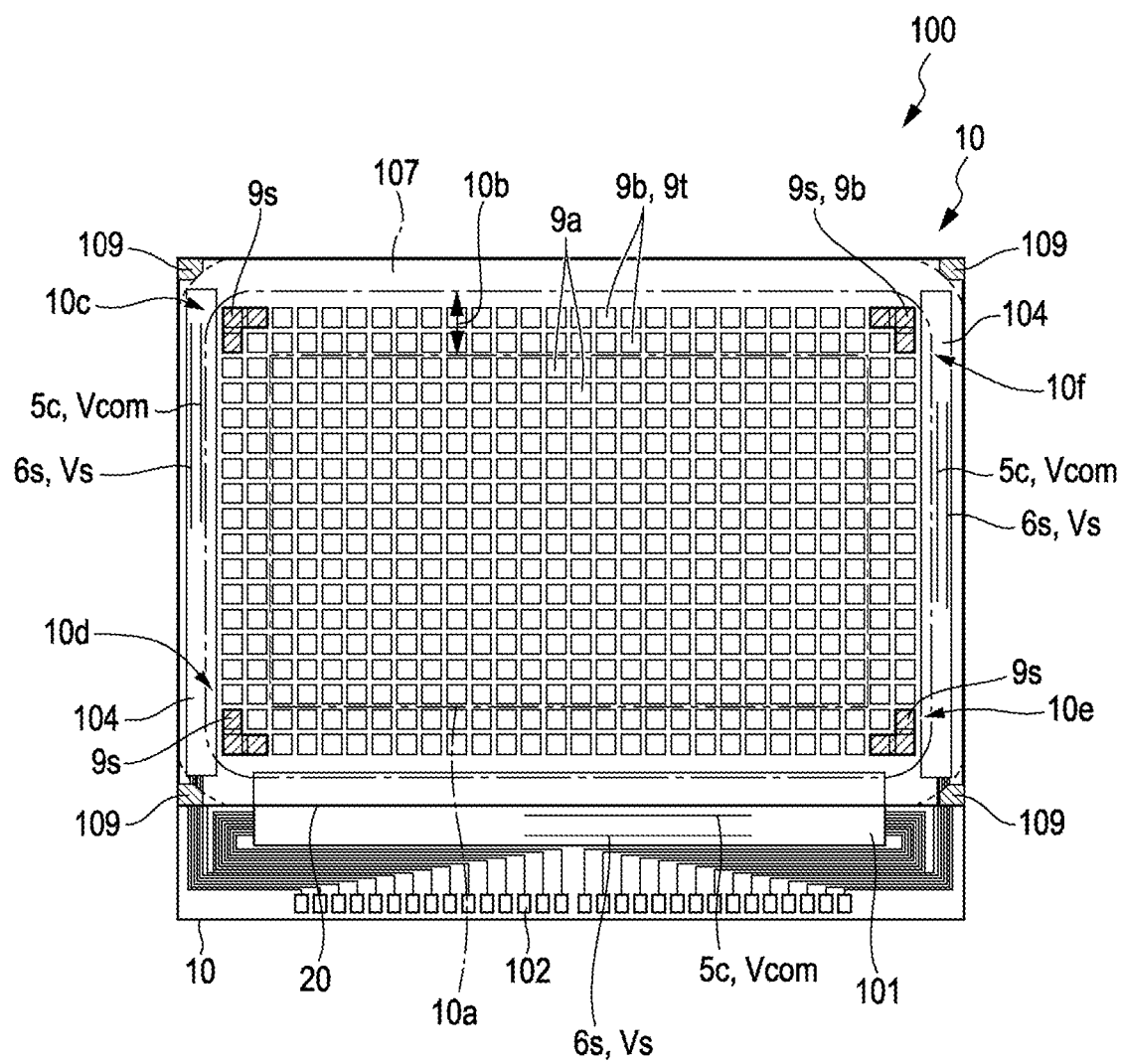
FIG. 10 is an explanatory diagram illustrating the configuration of the first substrate used in a liquid crystal device related to Embodiment 4 of the invention.

FIG. 10 is an explanatory diagram illustrating the configuration of the first substrate 10 used in the liquid crystal device 100 related to Embodiment 4 of the invention. In addition, in FIG. 10, the outline of the second substrate 20 is also shown. Further, since the basic configuration of this embodiment is the same as that of Embodiment 1, a common portion is denoted by the same reference numeral and explanation thereof is omitted.

As shown in FIG. 10, also with the liquid crystal device 100 of this embodiment, similarly to Embodiment 1, at an approximately central position of the first substrate 10, the pixel region 10a in which a plurality of pixel electrodes 9a is arranged, and the peripheral region 10b sandwiched between the pixel region 10a and the seal material 107 are provided, and at the peripheral region 10b, the dummy pixel electrodes 9b are formed.

Further, among a plurality of dummy pixel electrodes 9b, some dummy pixel electrodes 9b which are located at the four corner regions 10c, 10d, 10e, and 10f of the peripheral region 10b are connected to each other through the connection portion, thereby constituting the first peripheral electrode 9s of an L-shape.

In the liquid crystal device 100 configured in this manner, the first peripheral electrode 9s is electrically connected to the first constant potential line 6s of the high-potential side with the constant potential Vs applied thereto.

Here, among the dummy pixel electrodes 9b, the dummy pixel electrodes 9b which are not used as the first peripheral electrode 9s are electrically connected to the common potential line 5c with the common potential Vcom applied thereto. For this reason, the dummy pixel electrodes 9b which are not used as the first peripheral electrode 9s function as the second peripheral electrode 9t constituting a transverse electric field with respect to the first peripheral electrode 9s. At this time, if a structure is made in which the dummy pixel electrodes 9b are connected to each other through the connection portion 9u, there is no need to connect each of a plurality of dummy pixel electrodes 9b to the common potential line 5c.

In the liquid crystal device 100 configured in this manner, in this embodiment, the liquid crystal layer 50 performs inversion driving. However, the common potential Vcom applied to the common electrode 21 is constant at 0 V. Accordingly, the common potential Vcom applied to the common electrode 21, the constant potential Vs applied to the first peripheral electrode 9s, and the common potential Vcom applied to the dummy pixel electrodes 9b (the second peripheral electrode 9t) which are not used as the first peripheral electrode 9s have the relationship of the constant potential Vs≠the common potential Vcom=0 V. Accordingly, also in this embodiment, approximately similarly to Embodiment 1, even if the ionic impurities mixed in at the time of liquid crystal injection when manufacturing the liquid crystal device 100 or the ionic impurities eluted from the seal material 107 are present in the liquid crystal layer 50, such ionic impurities are drawn by an electric field formed between the first peripheral electrode 9s and the common electrode 21 and an electric field formed between the first peripheral electrode 9s and the second peripheral electrode 9t and retained in a state where they are aggregated there. Therefore, since the ionic impurities do not exude to the pixel region 10a, effects approximately equal to those in Embodiment 1, such as enabling deterioration of display quality due to the ionic impurities to be reliably prevented, can be obtained.

Embodiment 5

Figure 11:
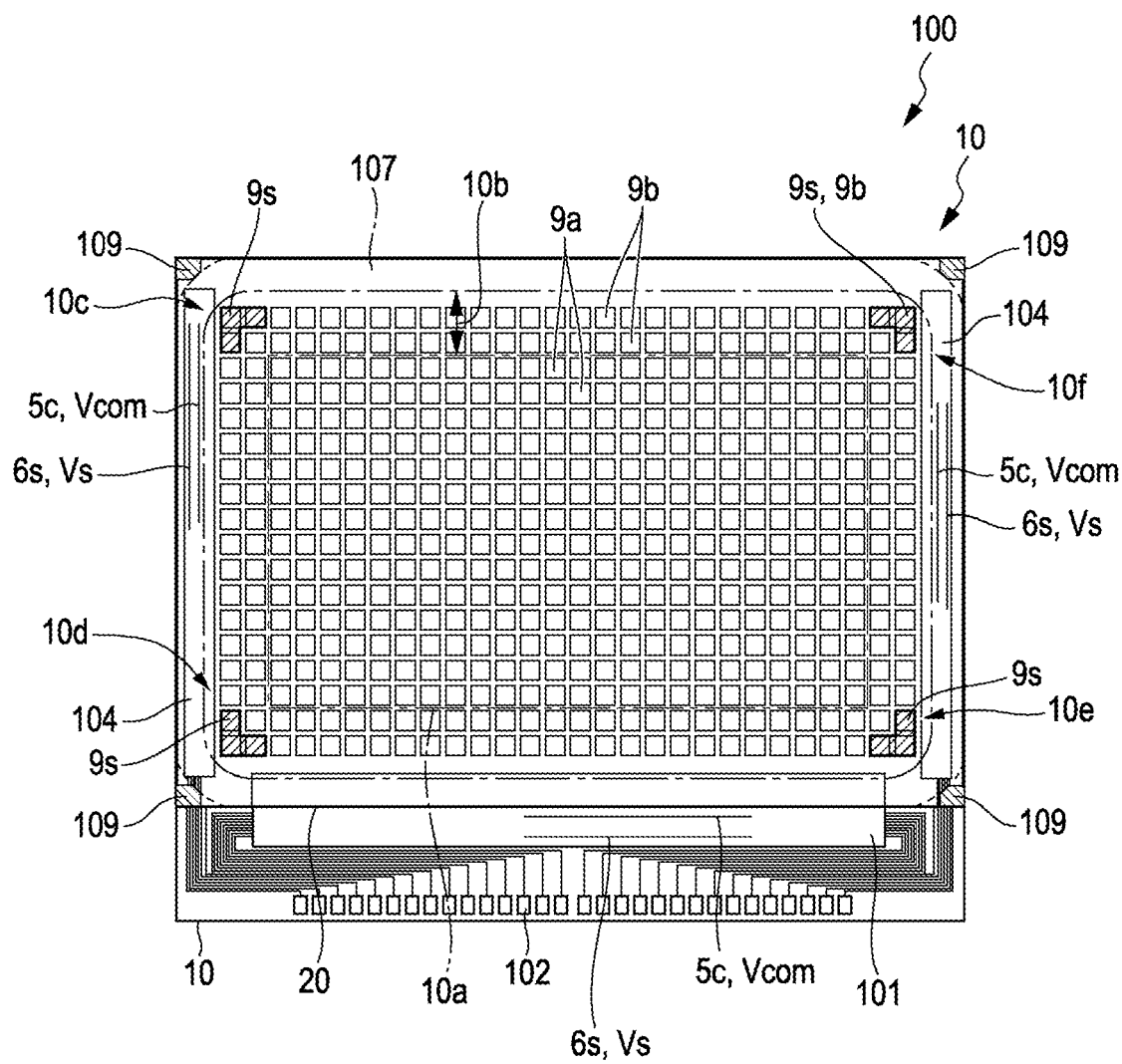
FIG. 11 is an explanatory diagram illustrating the configuration of the first substrate used in a liquid crystal device related to Embodiment 5 of the invention.

FIG. 11 is an explanatory diagram illustrating the configuration of the first substrate 10 used in the liquid crystal device 100 related to Embodiment 5 of the invention. In addition, in FIG. 11, the outline of the second substrate 20 is also shown. Further, since the basic configuration of this embodiment is the same as that of Embodiment 1, a common portion is denoted by the same reference numeral and explanation thereof is omitted.

As shown in FIG. 11, also with the liquid crystal device 100 of this embodiment, similarly to Embodiment 1, at an approximately central position of the first substrate 10, the pixel region 10a in which a plurality of pixel electrodes 9a is arranged, and the peripheral region 10b sandwiched between the pixel region 10a and the seal material 107 are provided, and at the peripheral region 10b, the dummy pixel electrodes 9b are formed.

Further, among a plurality of dummy pixel electrodes 9b, some dummy pixel electrodes 9b which are located at the four corner regions 10c, 10d, 10e, and 10f of the peripheral region 10b are connected to each other through the connection portion, thereby constituting the first peripheral electrode 9s of an L-shape.

In the liquid crystal device 100 configured in this manner, the first peripheral electrode 9s is electrically connected to the first constant potential line 6s of the high-potential side with the constant potential Vs applied thereto. Further, among the dummy pixel electrodes 9b, the dummy pixel electrodes 9b which are not used as the first peripheral electrode 9s are in a floating state without being applied with an electric potential. Accordingly, in this embodiment, the second peripheral electrode 9t constituting a transverse electric field with respect to the first peripheral electrode 9s is not constituted.

Further, in the liquid crystal device 100, the liquid crystal layer 50 performs inversion driving. However, the common potential Vcom applied to the common electrode 21 is constant at 0 V. Further, the common potential Vcom applied to the common electrode 21 and the constant potential Vs applied to the first peripheral electrode 9s have the relationship of the constant potential Vs≠the common potential Vcom=0 V. Accordingly, also in this embodiment, approximately similarly to Embodiment 1, even if the ionic impurities mixed in at the time of liquid crystal injection when manufacturing the liquid crystal device 100 or the ionic impurities eluted from the seal material 107 are present in the liquid crystal layer 50, such ionic impurities are drawn by an electric field formed between the first peripheral electrode 9s and the common electrode 21 and retained in a state where they are aggregated there. Therefore, since the ionic impurities do not exude to the pixel region 10a, effects approximately equal to those in Embodiment 1, such as enabling deterioration of display quality due to the ionic impurities to be reliably prevented, can be obtained.

Embodiment 6

Figure 12:
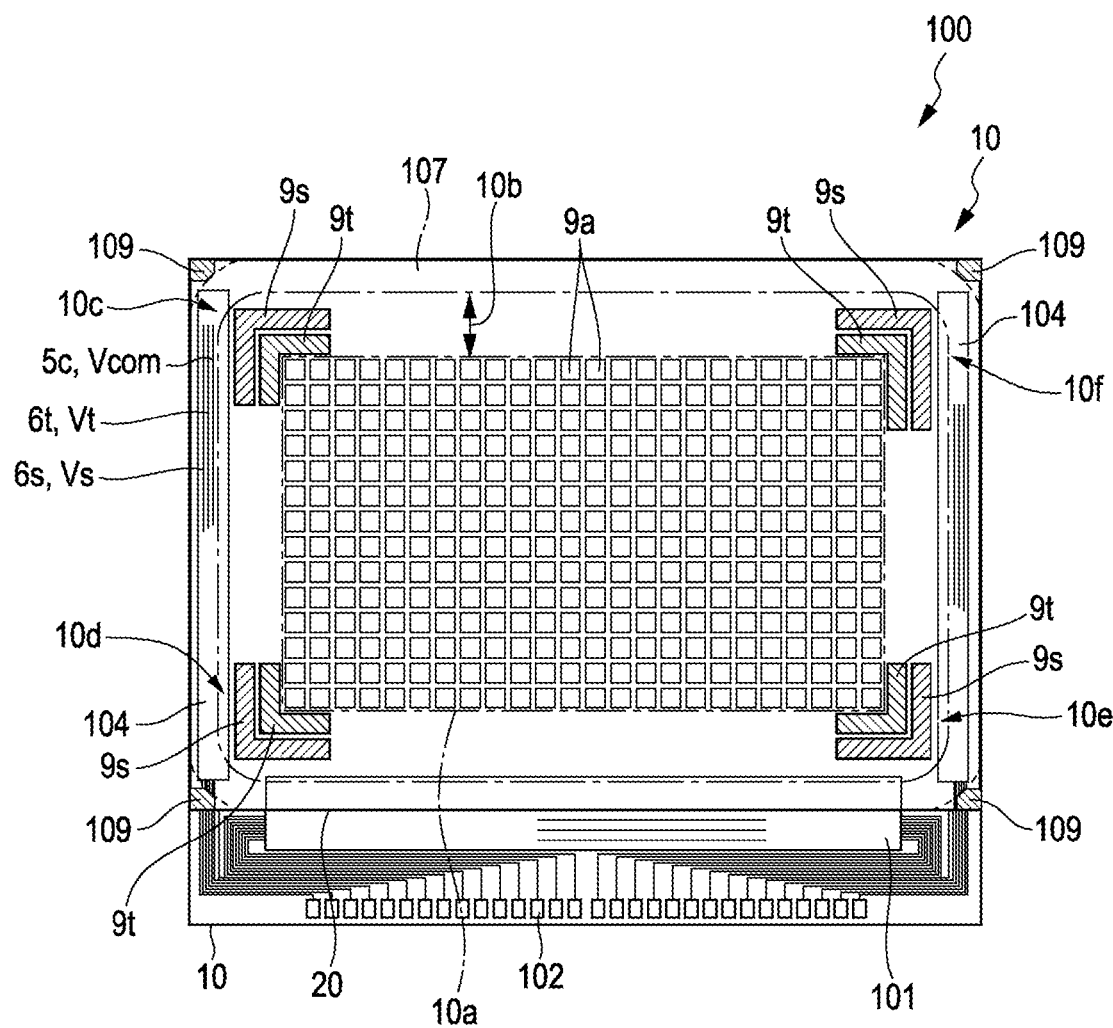
FIG. 12 is an explanatory diagram illustrating the configuration of the first substrate used in a liquid crystal device related to Embodiment 6 of the invention.

FIG. 12 is an explanatory diagram illustrating the configuration of the first substrate 10 used in the liquid crystal device 100 related to Embodiment 6 of the invention. In addition, in FIG. 12, the outline of the second substrate 20 is also shown. Further, since the basic configuration of this embodiment is the same as that of Embodiment 1, a common portion is denoted by the same reference numeral and explanation thereof is omitted.

As shown in FIG. 12, also with the liquid crystal device 100 of this embodiment, similarly to Embodiment 1, at an approximately central position of the first substrate 10, the pixel region 10a in which a plurality of pixel electrodes 9a is arranged, and the peripheral region 10b sandwiched between the pixel region 10a and the seal material 107 are provided.

Here, at the peripheral region 10b, the dummy pixel electrode 9b is not formed. However, at the four corner regions 10c, 10d, 10e, and 10f of the peripheral region 10b, the first and second peripheral electrodes 9s and 9t of an L-shape are formed by conductive films formed simultaneously with the pixel electrodes 9a.

In the liquid crystal device 100 configured in this manner, the first peripheral electrode 9s is electrically connected to the first constant potential line 6s of the high-potential side with the constant potential Vs applied thereto, and the second peripheral electrode 9t is electrically connected to the second constant potential line 6t of the low-potential side with the constant potential Vt applied thereto. Further, in the liquid crystal device 100, the liquid crystal layer 50 performs inversion driving. However, the common potential Vcom applied to the common electrode 21 is constant at 0 V. Further, the common potential Vcom applied to the common electrode 21, the constant potential Vs applied to the first peripheral electrode 9s, and the constant potential Vt applied to the second peripheral electrode 9t have the relationship of the constant potential Vt<the common potential Vcom=0 V<the constant potential Vs. Accordingly, also in this embodiment, similarly to Embodiments 1 and 2, even if the ionic impurities mixed in at the time of liquid crystal injection when manufacturing the liquid crystal device 100 or the ionic impurities eluted from the seal material 107 are present in the liquid crystal layer 50, such ionic impurities are efficiently drawn to the first peripheral electrode 9s, the second peripheral electrode 9t, a portion facing the first peripheral electrode 9s in the common electrode 21, and a portion facing the second peripheral electrode 9t in the common electrode 21 and retained in a state where they are aggregated there. Therefore, since the ionic impurities do not exude to the pixel region 10a, the same effects as those in Embodiment 1, such as enabling deterioration of display quality due to the ionic impurities to be reliably prevented, can be obtained. In addition, the configuration of the first peripheral electrode 9s and the second peripheral electrode 9t without using a dummy pixel electrode may also be applied to Embodiment 2 or the like.

Other Embodiments

In the above embodiments, the pixel electrode 9a or the like is formed by a light-transmitting conductive film such as ITO. However, the liquid crystal device 100 may be configured as a reflection type by forming the pixel electrode 9a or the like by a reflective conductive film such as aluminum or silver.

In the above embodiments, when the liquid crystal layer 50 performs inversion driving, the common potential Vcom applied to the common electrode 21 is set to be constant at 0 V and the polarity of an electric potential which is applied to the pixel electrode 9a is inverted. However, a common inversion method may be adopted in which the polarity of the common potential Vcom applied to the common electrode 21 is inverted. Even in a case where such a method is adopted, if the common potential Vcom applied to the common electrode 21, the constant potential Vs applied to the first peripheral electrode 9s, and the constant potential Vt applied to the second peripheral electrode 9t satisfy the relationship of the constant potential Vt<the common potential Vcom<the constant potential Vs, the relative polarity of each electrode does not change. Therefore, it is possible to make the drawn in ionic impurities be retained in a state where they are aggregated there.

Mounting Example on Electronic Apparatus

Figure 13A:
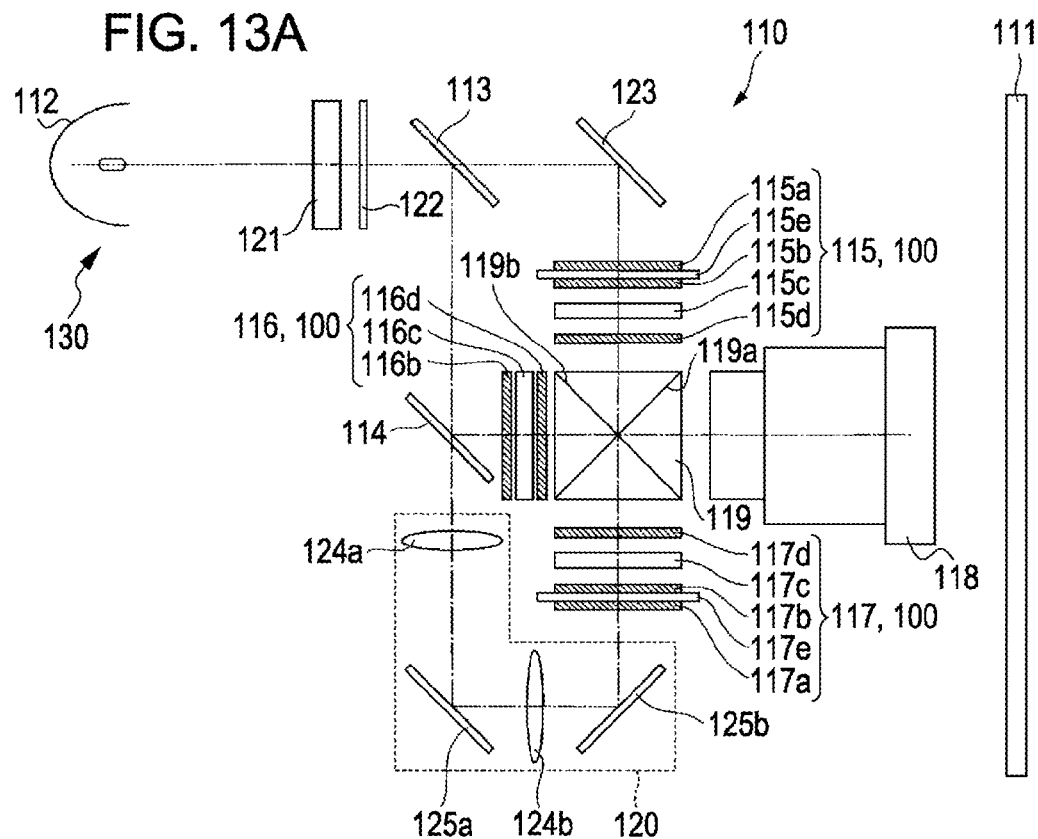
FIGS. 13A and 13B are schematic configuration diagrams of projection type display apparatuses using the liquid crystal device with the invention applied thereto.
Figure 13B:
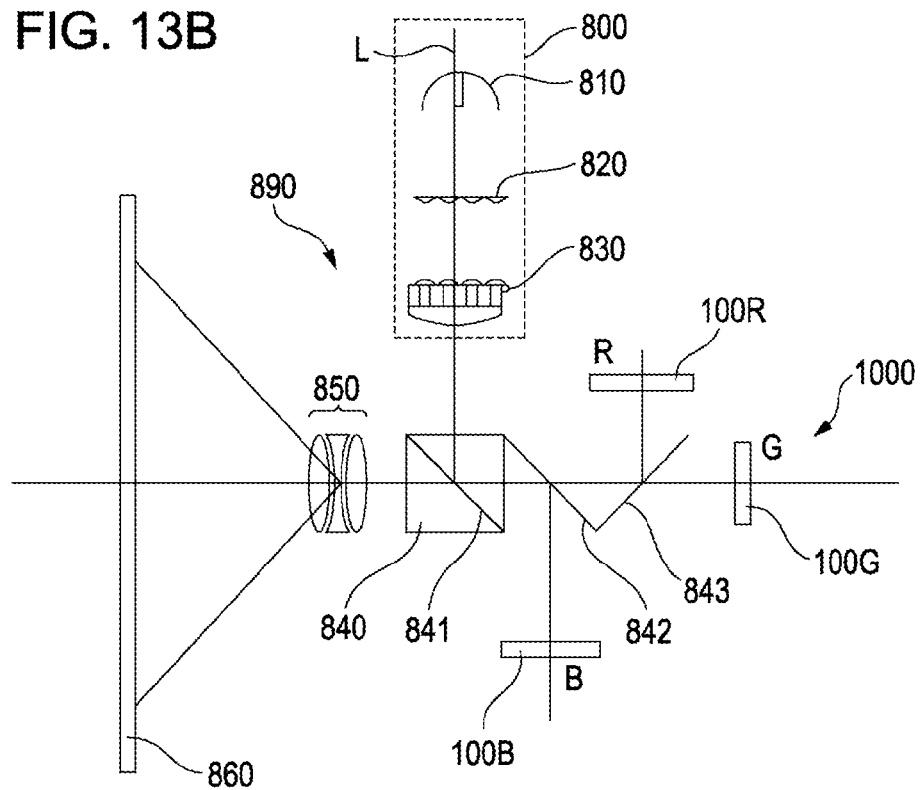

Electronic apparatuses in which the liquid crystal device 100 related to the above-described embodiments is applied thereto will be described. FIGS. 13A and 13B are schematic configuration diagrams of projection type display apparatuses using the liquid crystal device with the invention applied thereto, and FIGS. 13A and 13B are explanatory diagrams of a projection type display apparatus using a transmission type liquid crystal device 100 and a projection type display apparatus using a reflection type liquid crystal device 100.

First Example of Projection Type Display Apparatus

A projection type display apparatus 110 illustrated in FIG. 13A is a projection display apparatus of a so-called projection type in which a screen 111 provided at the viewer side is irradiated with light and light reflected by the screen 111 is observed. The projection type display apparatus 110 includes a light source section 130 having a light source 112, dichroic mirrors 113 and 114, liquid crystal light valves 115 to 117 (liquid crystal devices 100), a projection optical system 118, a cross dichroic prism 119, and a relay system 120.

The light source 112 is constituted by an extra high pressure mercury lamp which supplies light that includes red light, green light, and blue light. The dichroic mirror 113 has a configuration of transmitting the red light from the light source 112 and also reflecting the green light and the blue light. Further, the dichroic mirror 114 has a configuration of transmitting the blue light among the green light and the blue light reflected by the dichroic mirror 113 and also reflecting the green light. In this manner, the dichroic mirrors 113 and 114 constitute a color separation optical system which separates the light emitted from the light source 112 into the red light, the green light, and the blue light.

Here, an integrator 121 and a polarized light conversion element 122 are disposed in sequence from the light source 112 between the dichroic mirror 113 and the light source 112. The integrator 121 has a configuration of uniformizing illumination distribution of the light irradiated from the light source 112. Further, the polarized light conversion element 122 has a configuration of making the light from the light source 112 polarized light having a specific vibration direction, such as s-polarized light, for example.

The liquid crystal light valve 115 is a transmission type liquid crystal device 100 which modulates the red light transmitting the dichroic mirror 113 and then reflected by a reflecting mirror 123, in accordance with an image signal. The liquid crystal light valve 115 includes a λ/2 retardation plate 115a, a first polarizing plate 115b, a liquid crystal panel 115c, and a second polarizing plate 115d. Here, the red light being incident into the liquid crystal light valve 115 remains s-polarized light as polarization of the light does not change even if the light transmits the dichroic mirror 113.

The λ/2 retardation plate 115a is an optical element which converts the s-polarized light incident into the liquid crystal light valve 115 into p-polarized light. Further, the first polarizing plate 115b is a polarizing plate which blocks the s-polarized light and transmits the p-polarized light. Then, the liquid crystal panel 115c has a configuration of converting the p-polarized light into s-polarized light (if it is halftone, circularly-polarized light or elliptically-polarized light) by modulation according to an image signal. Further, the second polarizing plate 115d is a polarizing plate which blocks the p-polarized light and transmits the s-polarized light. Accordingly, the liquid crystal light valve 115 has a configuration of modulating the red light in accordance with an image signal and emitting the modulated red light toward the cross dichroic prism 119.

In addition, the λ/2 retardation plate 115a and the first polarizing plate 115b are disposed in a state where they come into contact with a light-transmitting glass plate 115e which does not convert the polarized light, so that it is possible to avoid distortion of the λ/2 retardation plate 115a and the first polarizing plate 115b by heat generation.

The liquid crystal light valve 116 is a transmission type liquid crystal device 100 which modulates the green light reflected by the dichroic mirror 113 and then reflected by the dichroic mirror 114, in accordance with an image signal. The liquid crystal light valve 116 includes a first polarizing plate 116b, a liquid crystal panel 116c, and a second polarizing plate 116d, similarly to the liquid crystal light valve 115. The green light being incident into the liquid crystal light valve 116 is s-polarized light which is reflected by the dichroic mirrors 113 and 114 and then incident. The first polarizing plate 116b is a polarizing plate which blocks the p-polarized light and transmits the s-polarized light. Further, the liquid crystal panel 116c has a configuration of converting the s-polarized light into p-polarized light (if it is halftone, circularly-polarized light or elliptically-polarized light) by modulation according to an image signal. The second polarizing plate 116d is a polarizing plate which blocks the s-polarized light and transmits the p-polarized light. Accordingly, the liquid crystal light valve 116 has a configuration of modulating the green light in accordance with an image signal and emitting the modulated green light toward the cross dichroic prism 119.

The liquid crystal light valve 117 is a transmission type liquid crystal device 100 which modulates the blue light reflected by the dichroic mirror 113, transmitting the dichroic mirror 114, and then passed through the relay system 120, in accordance with an image signal. The liquid crystal light valve 117 includes a λ/2 retardation plate 117a, a first polarizing plate 117b, a liquid crystal panel 117c, and a second polarizing plate 117d, similarly to the liquid crystal light valves 115 and 116. Here, the blue light being incident into the liquid crystal light valve 117 is made to be s-polarized light as it is reflected by the dichroic mirror 113, transmits the dichroic mirror 114, and is then reflected by two reflecting mirrors 125a and 125b, which will be described later, of the relay system 120.

The λ/2 retardation plate 117a is an optical element which converts the s-polarized light incident into the liquid crystal light valve 117 into p-polarized light. Further, the first polarizing plate 117b is a polarizing plate which blocks the s-polarized light and transmits the p-polarized light. The liquid crystal panel 117c has a configuration of converting the p-polarized light into s-polarized light (if it is halftone, circularly-polarized light or elliptically-polarized light) by modulation according to an image signal. Further, the second polarizing plate 117d is a polarizing plate which blocks the p-polarized light and transmits the s-polarized light. Accordingly, the liquid crystal light valve 117 has a configuration of modulating the blue light in accordance with an image signal and emitting the modulated blue light toward the cross dichroic prism 119. In addition, the λ/2 retardation plate 117a and the first polarizing plate 117b are disposed in a state where they come into contact with a glass plate 117e.

The relay system 120 includes relay lenses 124a and 124b and the reflecting mirrors 125a and 125b. The relay lenses 124a and 124b are provided in order to prevent light loss due to the long optical path of the blue light. Here, the relay lens 124a is disposed between the dichroic mirror 114 and the reflecting mirror 125a. Further, the relay lens 124b is disposed between the reflecting mirrors 125a and 125b. The reflecting mirror 125a is disposed so as to reflect the blue light transmitting the dichroic mirror 114 and then emitted from the relay lens 124a, toward the relay lens 124b. Further, the reflecting mirror 125b is disposed so as to reflect the blue light emitted from the relay lens 124b, toward the liquid crystal light valve 117.

The cross dichroic prism 119 is a color composition optical system in which two dichroic films 119a and 119b are disposed to orthogonally cross in a X-shape. The dichroic film 119a is a film which reflects blue light and transmits green light, and the dichroic film 119b is a film which reflects red light and transmits green light. Accordingly, the cross dichroic prism 119 is configured so as to combine the red light, the green light, and the blue light each modulated by each of the liquid crystal light valves 115 to 117 and then emit it toward the projection optical system 118.

In addition, the light which enter from the liquid crystal light valves 115 and 117 into the cross dichroic prism 119 are s-polarized light, and the light which is incident from the liquid crystal light valve 116 into the cross dichroic prism 119 is p-polarized light. In this manner, the light being incident into the cross dichroic prism 119 are set to be different types of polarized light, so that the light being incident from the respective liquid crystal light valves 115 to 117 can be combined in the cross dichroic prism 119. Here, in general, the dichroic films 119a and 119b are excellent in a reflection characteristic of s-polarized light. For this reason, the red light and the blue light which is reflected by the dichroic films 119a and 119b is set to be s-polarized light, and the green light which transmits the dichroic films 119a and 119b is set to be p-polarized light. The projection optical system 118 has a projection lens (not shown) and is configured so as to project the light combined in the cross dichroic prism 119 to the screen 111.

Second Example of Projection Type Display Apparatus

In a projection type display apparatus 1000 shown in FIG. 13B, a light source section 890 has a polarized light illuminating device 800 in which a light source 810, an integrator lens 820, and a polarized light conversion element 830 are disposed along a system optical axis L. Further, the light source section 890 includes along the system optical axis L a polarized light beam splitter 840 which reflects S-polarized light luminous flux emitted from the polarized light illuminating device 800 by a S-polarized light luminous flux reflecting surface 841, a dichroic mirror 842 which separates a component of blue light (B) among light reflected from the S-polarized light luminous flux reflecting surface 841 of the polarized light beam splitter 840, and a dichroic mirror 843 which reflects and separates a component of red light (R) among the luminous flux after the blue light is separated.

Further, the projection type display apparatus 1000 includes three reflection type liquid crystal devices 100 (liquid crystal devices 100R, 100G, and 100B), into which each color light is incident, and the light source section 890 supplies the given color light to the three liquid crystal devices 100 (the liquid crystal devices 100R, 100G, and 100B).

In such a projection type display apparatus 1000, after the light modulated in the three liquid crystal devices 100R, 100G, and 100B is combined by the dichroic mirrors 842 and 843 and the polarized light beam splitter 840, the combined light is irradiated to a projection target member such as a screen 860 by a projection optical system 850.

Other Projection Type Display Apparatuses

In addition, with respect to the projection type display apparatus, a configuration may be made such that a LED light source or the like which emits light of each color is used as a light source section and each color light emitted from such a LED light source is supplied to each of different liquid crystal devices.

Other Electronic Apparatuses

With respect to the liquid crystal device 100 with the invention applied thereto, it may be used as a direct-view type display device in an electronic apparatus such as a mobile telephone, a portable information terminal (PDAs: Personal Digital Assistants), a digital camera, a liquid crystal television, a car navigation apparatus, a videophone, a POS terminal, an apparatus provided with a touch panel, or the like, besides the above-described electronic apparatuses.

The entire disclosure of Japanese Patent Application No. 2010-229318, filed Oct. 12, 2010 is expressly incorporated by reference herein.

What is claimed is:

1. A liquid crystal device comprising:
   a first substrate having a pixel region having a plurality of pixel electrodes arranged at one face side;
   a second substrate having a common electrode to which a common potential is applied;
   a seal material which bonds the first substrate and the second substrate to each other;
   a liquid crystal layer held in a region surrounded by the seal material between the first substrate and the second substrate;
   a first peripheral electrode which is provided at a peripheral region located between the pixel region and the seal material at the one face side of the first substrate, and
   a second peripheral electrode which is provided at the peripheral region at a position adjacent to the first peripheral electrode,
   wherein a constant potential different from the common potential and having a constant polarity is applied to the first peripheral electrode,
   a constant potential different from that of the first peripheral electrode and having a constant polarity is applied to the second peripheral electrode, the common electrode overlaps the first peripheral electrode and the second peripheral electrode, and the constant potential which is applied to the first peripheral electrode, the constant potential which is applied to the second peripheral electrode, and the common potential which is applied to the common electrode satisfy the condition of the constant potential applied to the second peripheral electrode<the common potential applied to the common electrode<the constant potential applied to the first peripheral electrode.

2. The liquid crystal device according to claim 1, wherein the pixel region and the seal material have a quadrangular shape as a whole, and
   the first peripheral electrode and the second peripheral electrode are provided at a corner region sandwiched between a corner portion of the pixel region and a corner portion of the seal material.

3. The liquid crystal device according to claim 2, wherein the first peripheral electrode and the second peripheral electrode are provided only at four corner regions.

4. A projection type display apparatus provided with the liquid crystal device according to claim 3, the projection type display apparatus comprising:

a light source section that emits light which is supplied to the liquid crystal device; and a projection optical system that projects light modulated by the liquid crystal device.

5. The liquid crystal device according to claim 2, wherein the first peripheral electrode and the second peripheral electrode are provided at all of four corner regions, the first peripheral electrodes disposed at two adjacent corner regions among the four corner regions are connected to each other by a first extension portion which extends along a side portion of the pixel region, and the second peripheral electrodes disposed at two adjacent corner regions among the four corner regions are connected to each other by a second extension portion which extends along a side portion of the pixel region.

6. The liquid crystal device according to claim 5, wherein the first peripheral electrode has a larger width dimension than the first extension portion, and the second peripheral electrode has a larger width dimension than the second extension portion.

7. A projection type display apparatus provided with the liquid crystal device according to claim 6, the projection type display apparatus comprising:

a light source section that emits light which is supplied to the liquid crystal device; and a projection optical system that projects light modulated by the liquid crystal device.

8. A projection type display apparatus provided with the liquid crystal device according to claim 5, the projection type display apparatus comprising:

a light source section that emits light which is supplied to the liquid crystal device; and a projection optical system that projects light modulated by the liquid crystal device.

9. The liquid crystal device according to claim 1, wherein the first peripheral electrode and the second peripheral electrode are made of the same electrical conducting material as the plurality of pixel electrodes.

10. A projection type display apparatus provided with the liquid crystal device according to claim 9, the projection type display apparatus comprising:

a light source section that emits light which is supplied to the liquid crystal device; and a projection optical system that projects light modulated by the liquid crystal device.

11. The liquid crystal device according to claim 1, wherein at the first substrate, a plurality of dummy pixel electrodes which is made of the same electrical conducting material as the plurality of pixel electrodes is provided outside the pixel region, and some of the plurality of dummy pixel electrodes are connected to each other, so that the first peripheral electrode and the second peripheral electrode are constituted.

12. A projection type display apparatus provided with the liquid crystal device according to claim 11, the projection type display apparatus comprising:

a light source section that emits light which is supplied to the liquid crystal device; and a projection optical system that projects light modulated by the liquid crystal device.

13. A projection type display apparatus provided with the liquid crystal device according to claim 1, the projection type display apparatus comprising:

a light source section that emits light which is supplied to the liquid crystal device; and a projection optical system that projects light modulated by the liquid crystal device.

14. A projection type display apparatus provided with the liquid crystal device according to claim 2, the projection type display apparatus comprising:

a light source section that emits light which is supplied to the liquid crystal device; and a projection optical system that projects light modulated by the liquid crystal device.

15. A liquid crystal device comprising:

a first substrate having a pixel region, the pixel region having a plurality of pixel electrodes;

a second substrate having a common electrode to which a common potential is applied;

a seal material which bonds the first substrate and the second substrate to each other;

a first electrode which is provided at a first position between the pixel region and the seal material; and a second electrode which is provided at a second position adjacent to the first electrode, wherein a first constant potential different from the common potential and having a constant polarity is applied to the first electrode, a second constant potential different from the first constant potential and having a constant polarity is applied to the second electrode, the common electrode overlaps the first electrode and the second electrode, and the first constant potential, the second constant potential, and the common potential satisfy the condition of the second constant potential<the common potential<the first constant potential.

\* \* \* \* \*